US005982171A

United States Patent [19]
Umemoto et al.

[11] Patent Number: 5,982,171
[45] Date of Patent: Nov. 9, 1999

[54] SENSING DEVICE FOR DETECTING THE ANGULAR DISPLACEMENT AND RELATIVE POSITION OF A MEMBER OF MAGNETIC MATERIAL

[75] Inventors: Hideki Umemoto; Naoki Hiraoka; Wataru Fukui; Yutaka Ohashi; Masahiro Yokotani, all of Tokyo, Japan

[73] Assignee: Mitsubishi Denki Kabushiki Kaisha, Tokyo, Japan

[21] Appl. No.: 08/742,504

[22] Filed: Nov. 1, 1996

[30] Foreign Application Priority Data

Jun. 10, 1996 [JP] Japan .................................. 8-147556

[51] Int. Cl.$^6$ .............................. G01B 7/30; G01R 33/09; G01P 3/481; F02P 7/067
[52] U.S. Cl. ................................ 324/207.21; 123/406.58; 324/207.25; 324/174; 324/252
[58] Field of Search ..................................... 324/160, 166, 324/173, 174, 207.12, 207.2, 207.21, 207.22, 207.25, 252; 123/617, 406.52, 406.58

[56] References Cited

U.S. PATENT DOCUMENTS

| | | | |
|---|---|---|---|
| 4,039,936 | 8/1977 | Jones et al. | 324/207.21 |
| 4,677,377 | 6/1987 | Takahashi et al. | 324/207.21 X |
| 4,694,688 | 9/1987 | Takahashi et al. | 324/207.21 X |
| 4,712,064 | 12/1987 | Eckardt et al. | 324/207.21 |
| 4,853,632 | 8/1989 | Nagano et al. | 324/207.22 X |
| 4,935,698 | 6/1990 | Kawaji et al. | 324/207.2 |
| 4,970,463 | 11/1990 | Wolf et al. | 324/207.12 X |
| 5,019,776 | 5/1991 | Kawamata et al. | 324/207.12 |
| 5,021,736 | 6/1991 | Gonsalves et al. | 324/207.21 X |
| 5,038,130 | 8/1991 | Eck et al. | 324/207.21 X |
| 5,045,920 | 9/1991 | Vig et al. | 324/207.2 X |
| 5,134,371 | 7/1992 | Watanabe et al. . | |
| 5,475,304 | 12/1995 | Prinz | 324/207.21 |
| 5,570,016 | 10/1996 | Schroeder et al. | 324/207.21 X |
| 5,600,238 | 2/1997 | Holloway et al. | 324/207.21 |
| 5,600,297 | 2/1997 | Ruigrok et al. | 324/207.21 X |
| 5,744,950 | 4/1998 | Seefeldt | 324/207.21 |

FOREIGN PATENT DOCUMENTS

| | | |
|---|---|---|
| 0 319 737 | 6/1989 | European Pat. Off. . |
| 0 484 859 A2 | 5/1992 | European Pat. Off. . |
| 2820122 | 11/1979 | Germany ..................... 324/207.21 |
| 3426784 A1 | 1/1986 | Germany . |
| 44 35 678 A1 | 4/1995 | Germany . |
| 4427 495 A1 | 2/1996 | Germany . |

OTHER PUBLICATIONS

*Journal of Magnetics Society of Japan*, Vol. 15, No. 51991, pp. 813 to 820.

*Primary Examiner*—Gerard Strecker
*Attorney, Agent, or Firm*—Sughrue, Mion, Zinn, Macpeak & Seas, PLLC

[57] ABSTRACT

A sensing device capable of outputting a correct signal precisely corresponding to a particular position (angle) of, for example a protruding or recessed portion of a rotating member made of a magnetic material as soon as the electric power of the sensing device is turned on. The sensing device includes: a magnet for generating a magnetic field; a rotary member of magnetic material for changing the magnetic field generated by the magnet, the rotary member being disposed at a predetermined distance apart from the magnet; a giant magnetoresistance device which changes in resistance in response to the magnetic field whose magnitude is changed by the rotary member of magnetic material; and a differential amplifier for detecting the displacement of said rotary member of magnetic material and also the relative position of said rotary member of magnetic material with respect to said giant magnetoresistance device when said rotary member of magnetic material is at rest, on the basis of the output signal of said giant magnetoresistance device.

15 Claims, 24 Drawing Sheets

FIG. 5b  OUTPUT OF THE DIFFERENTIAL AMPLIFIER
FIG. 5c  OUTPUT OF THE WAVEFORM SHAPING CIRCUIT

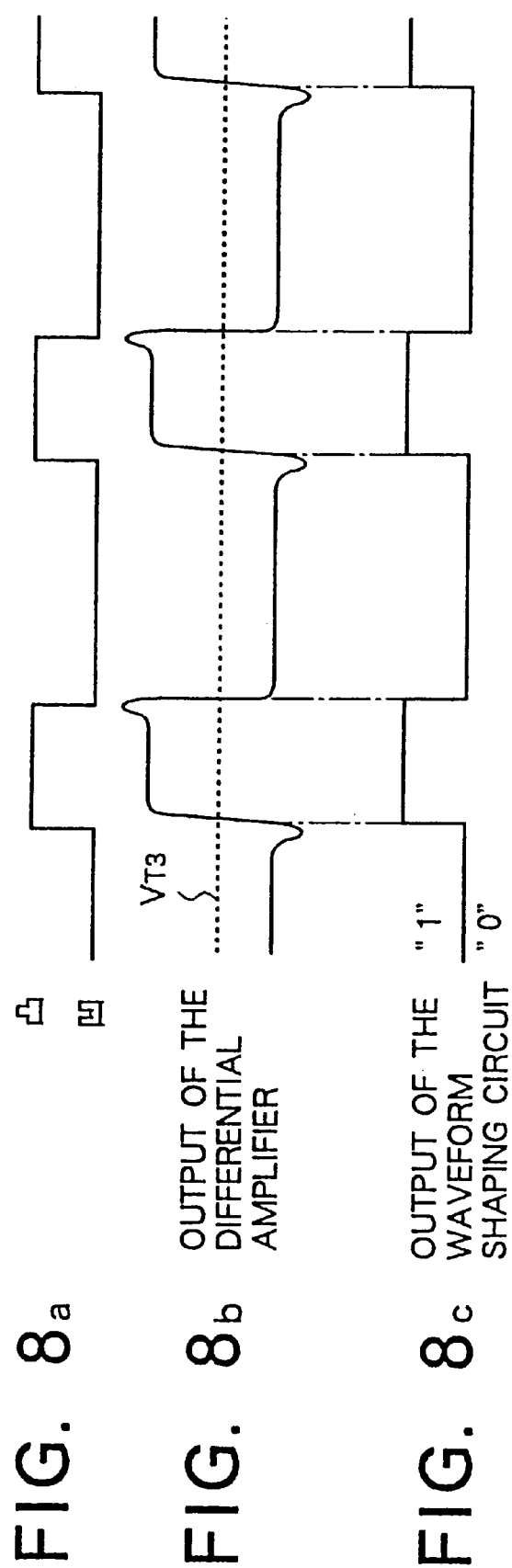

SENSING DEVICE FOR DETECTING THE ANGULAR DISPLACEMENT AND RELATIVE POSITION OF A MEMBER OF MAGNETIC MATERIAL

BACKGROUND OF THE INVENTION

1. Field of the Invention

The present invention relates to a sensing device for detecting the change in a magnetic field caused by the motion of a moving member of magnetic material, and more particularly, to a sensing device which is particularly suitable for detecting information about the rotation of for example an internal combustion engine.

2. Description of the Related Art

Magnetoresistance devices generally refer to those devices which change in resistance in response to the direction of a magnetic field applied to a thin ferromagnetic film with respect to the direction of a current flowing through the thin ferromagnetic film.

Magnetoresistance devices have minimum resistance when a magnetic field is applied in a direction at a right angle to the direction of current. On the other hand, when the angle between the direction of the current and the direction of the applied magnetic field is 0, that is when a magnetic field is applied in a direction the same as or opposite to the direction of current, the resistance has a maximum value. The change in the resistance is generally called the magnetoresistance effect, and the magnitude of the change in the resistance is referred to as the magnetoresistance variation ratio. A typical value of magnetoresistance variation ratio is 2 to 3% for Ni—Fe and 5 to 6% for Ni—Co.

FIGS. 32(a) and 32(b) illustrate the construction of a conventional sensing device, wherein its side view and perspective view are shown in FIG. 32(a) and FIG. 32(b), respectively.

The sensing device shown in FIGS. 32(a) and 32(b) includes: a rotating shaft 1; a rotary member of magnetic material 2 having at least one protruding or recessed portion wherein the rotary member of magnetic material 2 is adapted to rotate in synchronization with the rotation of the rotating shaft 1; a magnetoresistance device 3 disposed at a location a predetermined distance apart from the rotary member of magnetic material 2; and a magnet 4 for applying a magnetic field to the magnetoresistance device 3. In the above construction, the magnetoresistance device 3 includes a magnetoresistance pattern 3a and a thin film surface (magnetic field sensing plane) 3b.

If the rotary member of magnetic material 2 rotates, the magnetic field applied to the magnetic field sensing plane 3b of the magnetoresistance device 3 changes in response to the rotation of the rotary member of magnetic material 2, and, as a result, the resistance of the magnetoresistance pattern 3a changes correspondingly.

FIG. 33 is a block diagram illustrating the construction of the sensing device using the magnetoresistance devices described above.

The sensing device includes: a Wheatstone bridge circuit 11 including magnetoresistance devices disposed a predetermined distance apart from the rotary member of magnetic material 2 so that a magnetic field is applied from a magnet 4 to the magnetoresistance devices; a differential amplifier 12 for amplifying the output signal of the Wheatstone bridge circuit 11; a comparator 13 for comparing the output of the differential amplifier 12 with reference values $V_{T1}, V_{T2}$ and outputting a "0" signal or a "1" signal depending on the comparison result; a holding circuit 30 for holding the output of the comparator 13; a waveform shaping circuit 14 for shaping the waveform of the output of the holding circuit 30 and supplying a "0" or "1" signal having sharp rising and falling edges to the output terminal 15.

The operation will be described below with reference to FIGS. 34(a)–34(c).

If the rotary member of magnetic material 2 rotates, the magnetic field applied to each of the magnetoresistance devices changes in response to the passage of the protruding and recessed portions of the rotary member of magnetic material 2 as shown in FIG. 34(a). As a result, the above change in the magnetic field is detected by the magnetoresistance devices, and the midpoint voltages of the Wheatstone bridge circuit 11 also change in a similar fashion.

The difference between the mid-point voltages is amplified by the differential amplifier 12. Thus, as shown in FIG. 34b, the differential amplifier 12 outputs a signal corresponding to the passage of the protruding and recessed portions of the rotary member of magnetic material 2 shown in FIG. 34a.

The comparator 13 compares the output signal of the differential amplifier 12 with the reference values $V_{T1}, V_{T2}$ and outputs a "0" or "1" signal in response to the comparison result. The output signal of the comparator 13 is shaped by the waveform shaping circuit 14 so that a "0" or "1" output signal having sharp rising and falling edges is provided to the output terminal 15 as shown in FIG. 34(c).

However, the conventional sensing device having the above construction has the following problems.

That is, in the conventional sensing device, as shown in FIG. 35, no hysteresis exists in the characteristic of resistance versus applied magnetic field. As a result, in the operation of detecting the protruding and recessed portions of the rotating member of magnetic material, the output signal varies at each edge as shown in FIGS. 34(a)–34(c). However, as can be seen from FIGS. 34(a)–34(c), the signal level for protruding portions is equal to that for recessed portions. Therefore, the edges at the protruding and recessed portions must be detected and held by a holding circuit. Furthermore, since there is no difference in the output signal between the recessed and the protruding portions, it is impossible to obtain a signal precisely corresponding to the protruding and recessed portions of the rotating member of magnetic material for an instant after the electric power to the sensing device is turned on (the ability to start precise operation immediately after the power is turned on will be referred to as "instantaneous starting capability").

As described above, the problem of the conventional sensing device is that it is impossible to obtain a signal precisely corresponding to the protruding and recessed portions of the rotating member of magnetic material. Another problem is that it is impossible to start a correct operation immediately after the electric power is turned on.

It is a general object of the present invention to solve the above problems. More specifically, it is an object of the present invention to provide a sensing device capable of outputting a correct signal precisely corresponding to a particular position (angle) such as a protruding or recessed portion of a rotating member made of a magnetic material. Another object of the present invention to provide a sensing device capable of starting a correct operation immediately after the electric power is turned on.

SUMMARY OF THE INVENTION

According to an aspect of the present invention, there is provided a sensing device including: magnetic field generation means for generating a magnetic field; magnetic field variation inducing means for changing the magnetic field generated by the magnetic field generation means, the magnetic field variation inducing means being disposed a predetermined distance apart from said magnetic field generation means; magnetic field sensing element for detecting the magnetic field changed by the magnetic field variation inducing means; and detection means for detecting the displacement of the magnetic field variation inducing means and also the relative position of the magnetic field variation inducing means with respect to the magnetic field sensing element when the magnetic field variation inducing means is stationary, on the basis of the output signal of said magnetic field sensing element. In this arrangement, it becomes possible to start providing a correct output signal precisely corresponding to the location of the magnetic pole of the magnet provided on the moving member of magnetic material as soon as the power of the sensing device is turned on.

In one form of the invention, a giant magnetoresistance device is employed as the magnetic field sensing element and the operating range of the giant magnetoresistance device is set such that the change in resistance of the giant magnetoresistance device is not entirely uniform over the operating range in both directions of change in the magnetic field induced by the magnetic field variation inducing means. According to this arrangement, it becomes possible to start providing a correct output signal precisely corresponding to the location of the magnetic pole of the magnet provided on the moving member of magnetic material as soon as the power of the sensing device is turned on by means of the GMR device having hysteresis in resistance characteristics versus applied magnetic field.

In another form of the invention, a giant magnetoresistance device is disposed in such a manner that the center of the magnetic field sensing plane of the giant magnetoresistance device deviates from the center of the magnetic field generation means in a direction parallel to a plane containing the displacement direction of the magnetic field variation inducing means. According to the above arrangement, it becomes possible to start providing a correct output signal precisely corresponding to the location of the magnetic pole of the magnet provided on the moving member of magnetic material as soon as the power of the sensing device is turned on by means of the GMR device having hysteresis in resistance characteristics versus applied magnetic field. Furthermore, it is possible to obtain a greater output signal level in the detecting operation. This leads to an improvement in the detection accuracy, and also leads to high resistance to external noise, or a high signal-to-noise ratio.

In a further form of the invention, the sensing device further comprises processing means for performing an AC coupling process on the output signal of the magnetic field sensing element. In this arrangement, it becomes possible to start providing a correct output signal precisely corresponding to the location of the magnetic pole of the magnet provided on the moving member of magnetic material over the entire operating temperature, thereby improving detection accuracy. Furthermore, it becomes possible to start providing a correct output signal precisely corresponding to the location of the magnetic pole of the magnet provided on the moving member of magnetic material as soon as the power of the sensing device is turned on by using the GMR device having hysteresis in resistance characteristics versus applied magnetic field, and processing and outputting a signal prior to the AC coupling process when providing the above correct output signal.

In a still further form of the invention, the detection means comprises: first detection means for detecting the displacement of the magnetic field variation inducing means on the basis of the output signal of the magnetic field sensing element; and second detection means for detecting the position of the magnetic field sensing element relative to the magnetic field variation inducing means when the magnetic field variation inducing means is stationary, and the sensing device further comprises a bridge circuit, at least one of branches of the bridge circuit being composed of the magnetic field sensing element, the first detection means being adapted to operate on the basis of the output of the bridge circuit, the second detection means being adapted to operate on the basis of the overall resistance of the bridge circuit. In this arrangement, it becomes possible to start providing a correct output signal precisely corresponding to the location of the magnetic pole of the magnet provided on the moving member of magnetic material as soon as the power of the sensing device is turned on.

In a yet further form of the invention, the detection means comprises: first detection means for detecting the displacement of the magnetic field variation inducing means on the basis of the output signal of the magnetic field sensing element; and second detection means for detecting the position of the magnetic field sensing element relative to the magnetic field variation inducing means when the magnetic field variation inducing means is stationary, and the magnetic field sensing element comprises a first magnetic field sensing element and a second magnetic field sensing element, the first detection means being adapted to operate on the basis of the output of the first magnetic field sensing element, the second detection means being adapted to operate on the basis of the output of the second magnetic field sensing element. In this arrangement, it becomes possible to start providing a correct output signal precisely corresponding to the location of the magnetic pole of the magnet provided on the moving member of magnetic material as soon as the power of the sensing device is turned on.

In still another form of the invention, the magnetic field variation inducing means is composed of a moving member of magnetic material provided with at least one protruding or recessed portion. According to this arrangement, it becomes possible to detect smaller protruding or recessed portions, and therefore it is possible to realize a small-sized and low-cost sensing device with improved detection accuracy.

In a still another form of the invention, the magnetic field generation means and the magnetic field variation inducing means are formed into a moving member of magnetic material provided with at least one magnetic pole so that the moving member of magnetic material generates a magnetic field which changes in accordance with movement of the moving member. According to the above arrangement, it becomes possible to start providing a correct output signal precisely corresponding to the location of the magnetic pole of the magnet provided on the moving member of magnetic material as soon as the power of the sensing device is turned on.

In still another form of the invention, the moving member of magnetic material is a rotary member which rotates in synchronization with a rotating shaft. This arrangement ensures that the sensing device can precisely detect the change in the magnetic field caused by the rotation of the rotary member of magnetic material.

In still another form of the invention, the sensing device includes a main part of the sensing device provided with the magnetic field sensing element, the rotary member being mounted on a crank shaft or a cam shaft of an internal combustion engine, the main part of the sensing device being disposed adjacent to the internal combustion engine so that the rotary member faces the magnetic field sensing element. This arrangement makes it possible to achieve a small-sized and high-precision sensing device which can precisely detect the rotation angle (rotation speed) of the crank shaft or the cam shaft of an internal combustion engine. As a result, it becomes possible to precisely control the internal combustion engine. Furthermore, the sensing device can be easily mounted in a highly reliable fashion on an internal combustion engine without requiring a large mounting space.

In still another form of the invention, the main part of the detecting apparatus is disposed at a location away from the rotary member in a direction along the axis of the rotating shaft. In this arrangement, the space near the rotating shaft can be effectively utilized to install the main part of the sensing device. This means that no additional space in a radial direction is required to install the main part of the sensing device, and therefore it is possible to further reduce the size of the sensing device.

In still another form of the invention, the main part of the detecting apparatus includes a housing in which the magnetic field sensing element is disposed, and the rotary member is disposed in a space on a side of the housing in such a manner that at least the periphery of the rotary member faces the magnetic field sensing element. In this arrangement, a magnetic path is formed through the rotary member and the magnetic field sensing element. Therefore, this structure has, in effect, the same function as the rotary member of magnetic material at least a part of which is formed of a magnet. As a result, in this structure, it becomes possible to start providing a correct out put signal precisely corresponding to the rotation angle of the rotary member as soon as the power of the sensing device is turned on.

BRIEF DESCRIPTION OF THE DRAWINGS

FIGS. 5(a)–5(c) are waveform diagrams illustrating the operation relating to the first embodiment of the sensing device according to the present invention;

FIGS. 8(a)–8(c) are waveform diagrams illustrating the operation relating to the second embodiment of the sensing device according to the present invention;

DESCRIPTION OF THE PREFERRED EMBODIMENTS

With reference to preferred embodiments, the sensing device according to the present invention will be described in greater detail below in connection with the accompanying drawings.

Embodiment 1

Figure 1A:
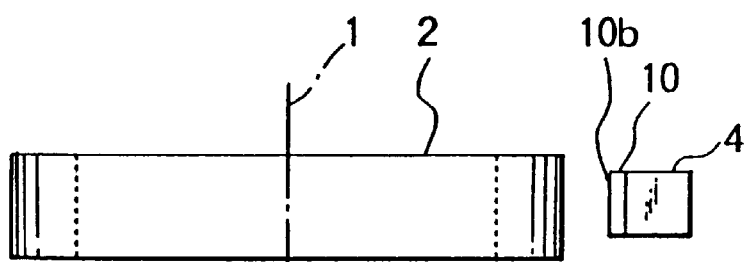
FIGS. 1(a) and 1(b) are schematic diagrams illustrating a first embodiment of a sensing device according to the present invention.
Figure 1B:
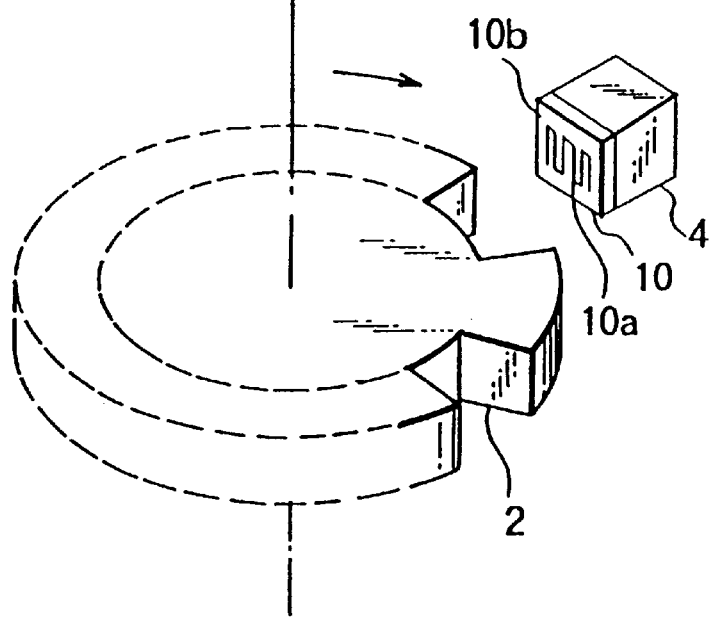

FIGS. 1(a) and 1(b) illustrate a first embodiment of a sensing device according to the present invention, wherein FIGS. 1a and 1b are a side view and a perspective view thereof, respectively.

The sensing device includes: a rotating shaft 1; a rotary member of magnetic material 2 serving as magnetic field variation inducing means, the rotary member of magnetic material 2 having at least one protruding or recessed portion, the rotary member of magnetic material 2 being adapted to rotate in synchronization with the rotation of the rotating shaft 1; a magnetic field sensing element, for example, a giant magnetoresistance device 10 disposed in a radial direction from the rotary member of magnetic material 2 at a location a predetermined distance apart from the rotary member of magnetic material 2; and a magnet 4 serving as magnetic field generating means for supplying a magnetic field to the giant magnetoresistance device 10, wherein the giant magnetoresistance device 10 includes a magnetoresistance pattern 10a serving as a magnetic field sensing pattern and a thin film plane (magnetic field sensing plane) 10b. The pattern 10a is a partial schematic representation of the bridge circuit shown in FIG. 3.

If the rotary member of magnetic material 2 rotates, the magnetic field applied to the magnetic field sensing plane 10b of the giant magnetoresistance device 10 changes, and thus the resistance of the magnetoresistance pattern 10a changes correspondingly.

In this sensing device, the giant magnetoresistance device 10 has a multilayer structure consisting of alternately grown magnetic layers and non-magnetic layers each having a thickness in the range from a few Å to a few tens of Å. Such a multilayer structure is known as the superlattice structure, and a specific example is disclosed in a paper entitled "Magnetoresistance effect of multilayers" published in the Journal of Magnetics Society of Japan, Vol. 15, No. 51991, pp. 813 to 821. Specific structures includes (Fe/Cr)n, (permalloy/Cu/Co/Cu)n, (Co/Cu)n, etc. These superlattice structures exhibit much greater magnetoresistance effect (giant magnetoresistance effect) than conventional magnetoresistance devices. In these giant magnetoresistance devices with a superlattice structure, the magnetoresistance effect depends only on the relative angle between magnetization of adjacent magnetic layers, and therefore the change in resistance does not depend on the direction of the external magnetic field applied with respect to the direction of current (this property is referred to as "in-plane magnetic field sensitivity).

In view of the above, in the present invention, the magnetic field sensing plane for detecting the change in the magnetic field is formed substantially with giant magnetoresistance devices 10 wherein electrodes are formed so that the respective giant magnetoresistance devices are connected in such a manner as to form a bridge circuit. Two opposite nodes of the bridge circuit are connected to a constant voltage source or a constant current source so that the change in resistance of the giant magnetoresistance devices 10 is converted into the change in voltage thereby detecting the change in the magnetic field applied to the giant magnetoresistance devices 10.

In the present embodiment, the film thicknesses of the magnetic and non-magnetic layers are optimized within the range of from a few Å to a few tens of Å so that the GMR device 10 has a desirable hysteresis in the characteristic of resistance versus applied magnetic field.

Figure 4:
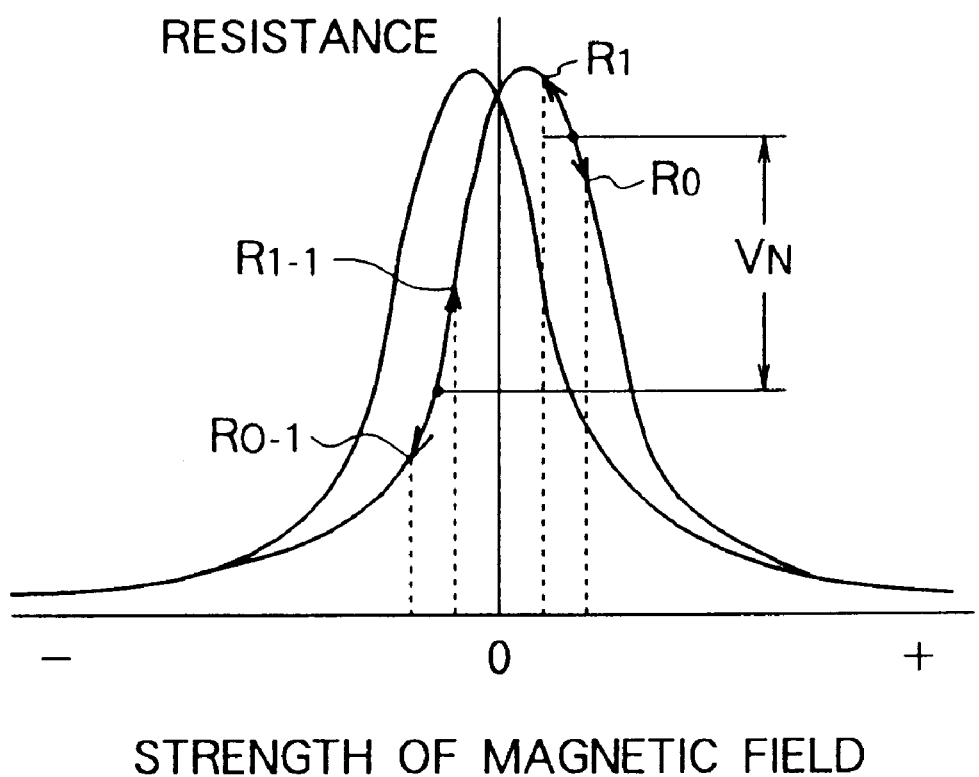
FIG. 4 is a characteristic diagram illustrating the change of resistance of the GMR device versus strength of a magnetic field at the first embodiment of the sensing device according to the present invention.

For example, as shown in FIG. 4, when a GMR device has a multilayer structure consisting of a Co layer with a thickness of 15 Å and a Cu layer with a thickness of 9 Å, it exhibits no hysteresis. However, if the thicknesses are modified such that the Co layer has a thickness of 15 Å and the Cu layer has a thickness of 22 Å, then the resultant GMR device exhibits hysteresis in the characteristic of resistance versus applied magnetic field.

Figure 2:
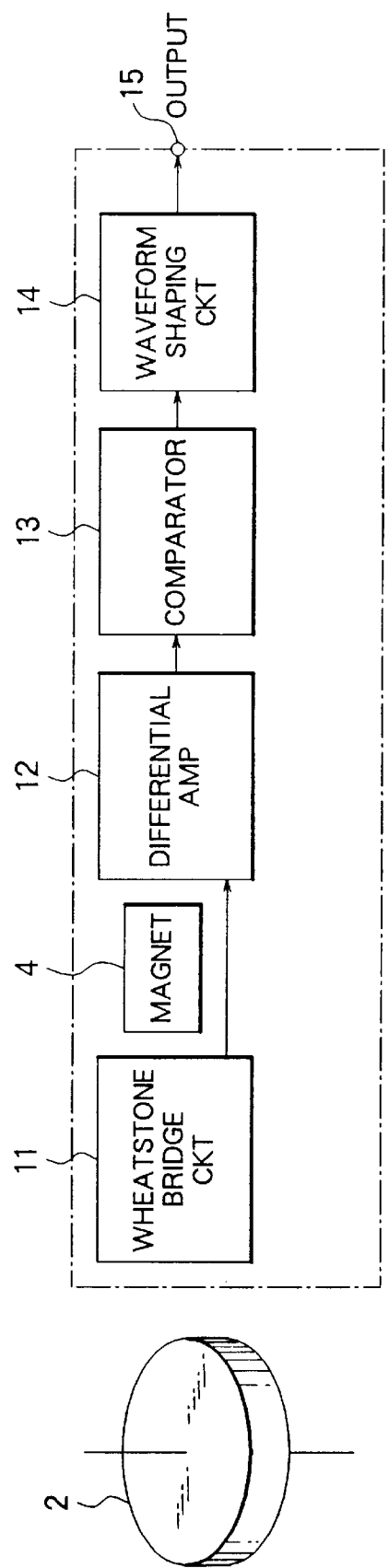
FIG. 2 is a block diagram illustrating the circuit configuration of the first embodiment of the sensing device according to the present invention.

FIG. 2 is a block diagram illustrating the construction of the sensing device using the giant magnetoresistance devices having hysteresis described above.

The sensing device includes: a Wheatstone bridge circuit 11 including giant magnetoresistance devices disposed a predetermined distance apart from the rotary member of magnetic material 2 so that a magnetic field is applied from a magnet 4 to the giant magnetoresistance devices; a differential amplifier 12 for amplifying the output signal of the Wheatstone bridge circuit 11; a comparator 13 for comparing the output of the differential amplifier with a reference value and outputting a "0" signal or a "1" signal depending on the comparison result; a waveform shaping circuit 14 for shaping the waveform of the output of the comparator 13 and supplying a "0" or "1" signal having sharp rising and falling edges to the output terminal 15. The above Wheatstone bridge circuit 11, differential amplifier 12, comparator 13, and waveform shaping circuit 14 form signal processing means.

Figure 3:
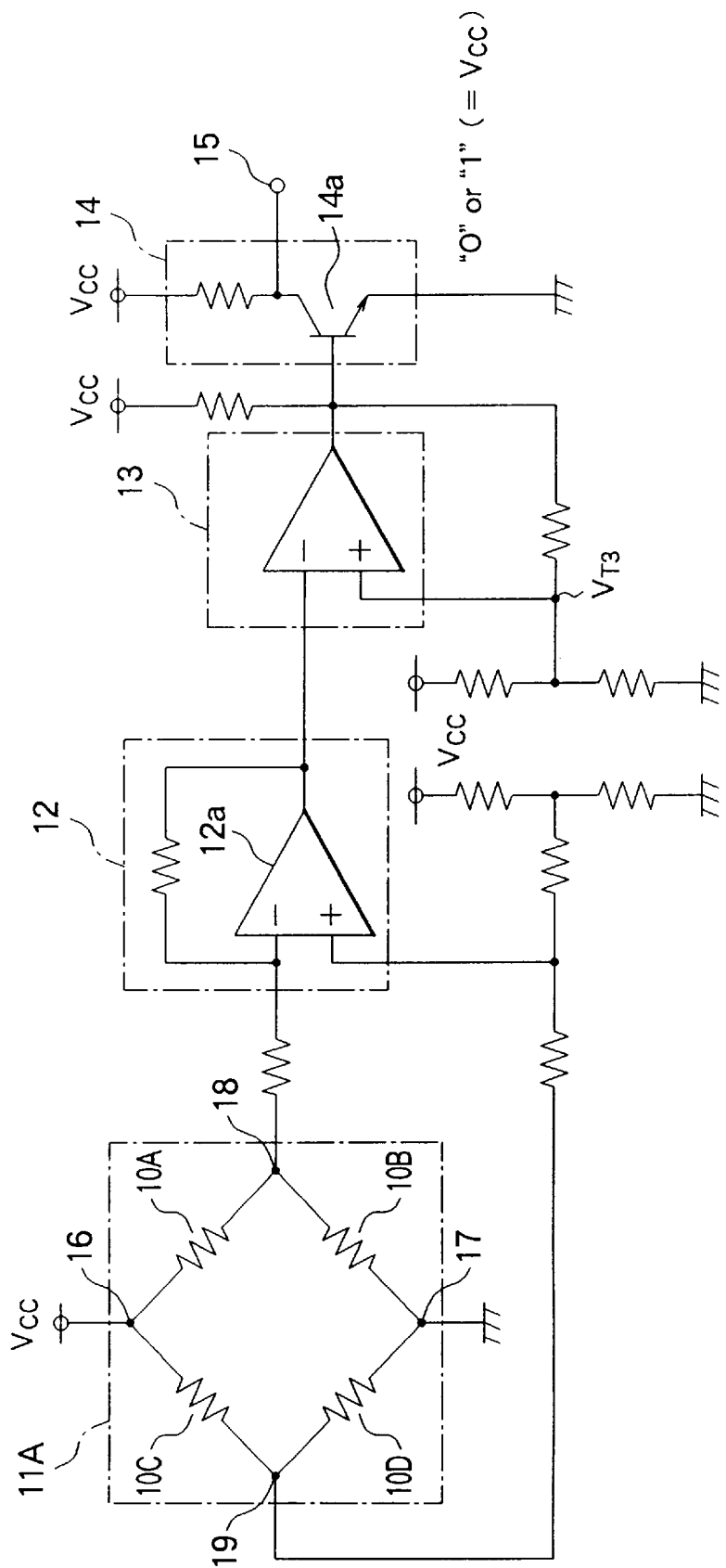
FIG. 3 is a circuit diagram illustrating a specific example of the circuit of FIG. 2.

FIG. 3 is a circuit diagram illustrating a specific example of the circuit shown in FIG. 2.

The Wheatstone bridge circuit 11A includes branches 10A, 10B, 10C, and 10D which are each formed with a giant magnetoresistance device. As schematically illustrated in FIG. 3 one end of the giant magnetoresistance device 10A and one end of the giant magnetoresistance device 10C are connected in common to each other, and the node 16 between these devices 10A and 10C is connected to the power supply terminal Vcc. One end of the giant magnetoresistance device 10B and one end of the giant magnetoresistance device 10D are connected in common to each other, and the node 17 between these devices 10B and 10D is grounded. The other ends of the giant magnetoresistance devices 10A and 10B are connected to a node 18, while the other ends of the giant magnetoresistance devices 10C and 10D are connected to a node 19.

The node 18 of the Wheatstone bridge circuit 11A is connected, via a resistor, to the inverting input of the amplifier 12a constituting the differential amplifier 12. The node 19 is connected, via a resistor, to the non-inverting input of the amplifier 12a wherein the non-inverting input of the amplifier 12a is further connected, via a resistor, to a voltage divider constituting a reference power supply.

The output terminal of the amplifier 12a is connected to the inverting input terminal of the comparator 13. The non-inverting input terminal of the comparator 13 is connected to a voltage divider constituting a reference power supply which is composed of resistors and also connected via a resistor to the output terminal of the comparator 13.

The output of the comparator 13 is also connected to the base of a transistor 14a. The collector of the transistor 14a is connected to the output terminal 15 and also to a power supply terminal Vcc via a resistor. The emitter of the transistor 14a is grounded.

The operation will be firstly described below with reference to FIGS. 5(a)–5(c).

Figure 5A:
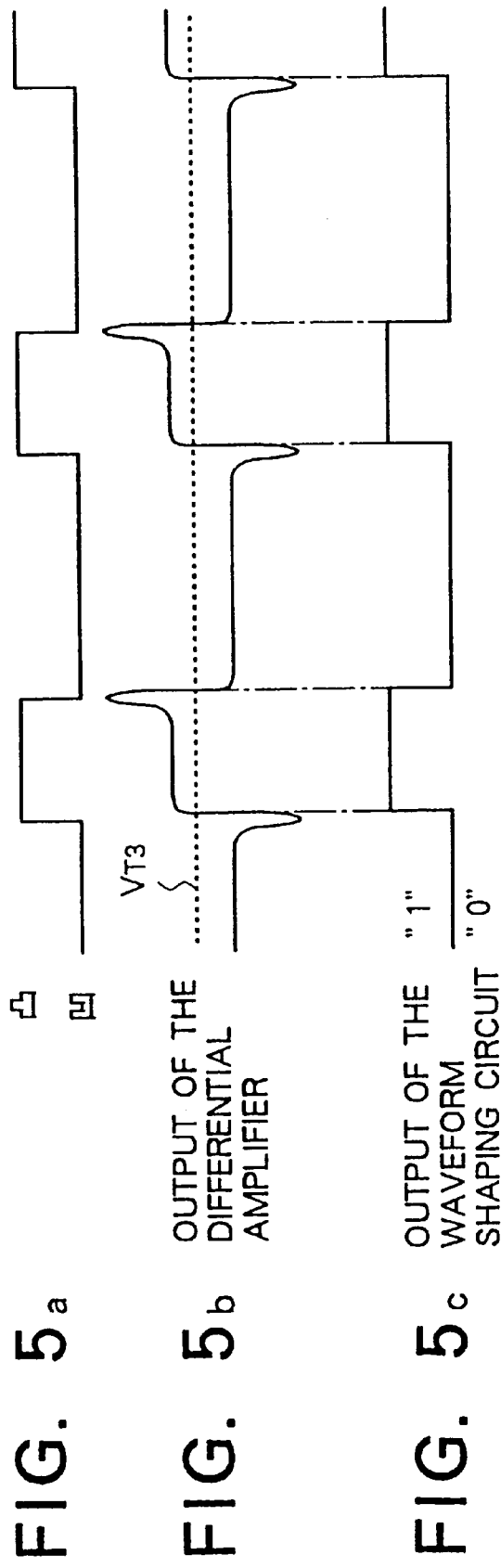

If the rotary member of magnetic material 2 rotates, the magnetic field applied to the giant magnetoresistance devices 10A to 10D changes in response to the passage of the protruding and recessed portions of the rotary member of magnetic material 2 as shown in FIG. 5a, wherein the magnetic field applied to the magnetoresistance devices 10A and 10D is, in effect, opposite in phase to that applied to the magnetoresistance devices 10B and 10C. The above change in the magnetic field is detected by the magnetoresistance devices 10A and 10D, and also by the magnetoresistance devices 10B and 10C wherein the phase of the magnetic field detected by the magnetoresistance devices 10A and 10D becomes opposite to that detected by the magnetoresistance devices 10B and 10C. As a result, the overall magnitude of the change in the magnetic field becomes, in effect, four times greater than that which can be sensed by a single giant magnetoresistance device.

A corresponding change in resistance occurs in each giant magnetoresistance device. Thus, the giant magnetoresistance devices 10A and 10D have maximum and minimum resistances at locations opposite in phase to those where the giant magnetoresistance elements 10B and 10C have maximum and minimum resistances. As a result, the voltages at the nodes 18 and 19 (mid-point voltages) of the Wheatstone bridge circuit 11A also change in a similar fashion.

In the case of the GMR device which exhibits hysteresis in the characteristic of resistance versus applied magnetic field, as can be seen from FIG. 4, when a protruding portion of the rotating member 2 of magnetic material comes to the location nearest to the GMR device 10A, the direction of the magnetic field becomes perpendicular to the magnetic field sensing plane of the GMR device 10A (and the strength of the magnetic field decreases). In this state, the GMR device 10A has a resistance of $R_1$. On the other hand, if a recessed portion of the rotating member 2 of magnetic material comes to the location nearest to the GMR device 10A, the magnetic field comes to have a certain angle to the magnetic field sensing plane of the GMR device 10A (and the strength of the magnetic field increases). In this state, the GMR device 10A has a resistance of $R_0$ ($<R_1$).

Similarly, if a protruding portion of the rotating member 2 of magnetic material comes to the location nearest to the GMR device 10B, the direction of the magnetic field becomes perpendicular to the magnetic field sensing plane of the GMR device 10B (the strength of the magnetic field decreases) and its resistance becomes $R_{1\text{-}1}$. On the other hand, when a recessed portion of the rotating member 2 of magnetic material comes to the location nearest to the GMR device 10B, the magnetic field comes to have a certain angle to the magnetic field sensing plane of the GMR device 10B (the strength of the magnetic field increases), and its resistance becomes $R_{0\text{-}1}$ ($<R_{1\text{-}1}$). The other GMR devices 10C and 10D also behave in a similar manner.

Therefore, if the Wheatstone bridge circuit 11 is constructed with such GMR devices, the output of the Wheatstone bridge circuit 11A appearing as the mid-point voltage $V_N$ between the nodes 18 and 19 has a difference between the protruding and recessed portions of the rotating member 2 of magnetic material, as shown in FIG. 4.

The difference in the mid-point voltage is amplified by the differential amplifier 12. As shown in FIG. 5b, the differential amplifier 12 outputs a signal corresponding to the protruding and recessed portions of rotating member 2 of magnetic material shown in FIG. 5a. Thus, the output signal of the differential amplifier 12 is substantially four times greater than that obtained by a single GMR device.

The output of this differential amplifier 12 is applied to the comparator 13 so as to make comparison with the reference voltage $V_{T3}$ (which corresponds to $V_{T1}$, $V_{T2}$ described above). The comparator 13 outputs a "0" or "1" signal in accordance with the comparison result. The waveform of this signal is then shaped by the waveform shaping circuit 14. As a result, an output signal having a "0" or "1" level with sharp rising and falling edges is provided via the output terminal 15 as shown in FIG. 5c.

Thus the comparator 13 can compare the instantaneous value of the output of the differential amplifier 12 corresponding to the protruding and recessed portions of the rotating member 2 of magnetic material with the reference value $V_{T3}$ regardless of the edges in the output signal. This means that the differential amplifier 12 can start to provide an output signal precisely corresponding to the protruding and recessed portions of the rotating member 2 of magnetic material as soon as the electric power is turned on.

Although the Wheatstone bridge circuit constructed with GMR devices is employed in this specific embodiment, other similar bridge circuit configurations may also be employed.

In the present embodiment, as described above, the film thicknesses of the magnetic and non-magnetic layers constituting the multilayer structure of the GMR device are optimized so that the GMR device has a desirable hysteresis in the resistance versus applied magnetic field characteristic.

Due to the hysteresis of the GMR device, the Wheatstone bridge circuit exhibits a difference in the output signal level between the protruding and recessed portions of the rotating member of magnetic material. This makes it possible to obtain an output signal which precisely corresponds to the protruding and recessed portions of the rotating member of magnetic material as soon as the electric power of the sensing device is turned on, that is, it is possible to achieve an instantaneous starting operation with high reliability.

Furthermore, the detection of the protruding and recessed portions of the rotating member of magnetic material is essentially based on the detection of the instantaneous value of the output of the differential amplifier. Therefore, in the present embodiment, it is not necessary to detect the edges of the protruding and recessed portions, and thus the holding circuit is no longer required.

Embodiment 2

Figure 6A:
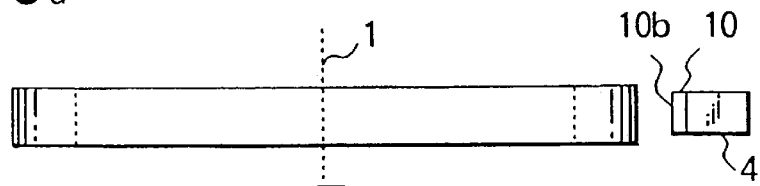
FIGS. 6(a) and 6(b) are schematic diagrams illustrating a second embodiment of a sensing device according to the present invention.
Figure 6B:
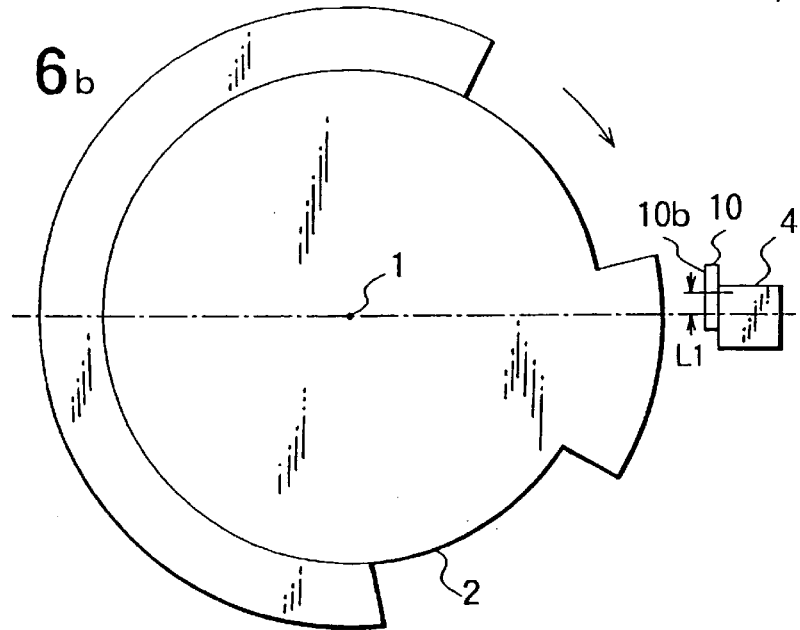

FIGS. 6(a) and 6(b) illustrate a second embodiment of the present invention, wherein its side view and plan view are shown in FIGS. 6a and 6b, respectively.

Figure 7:
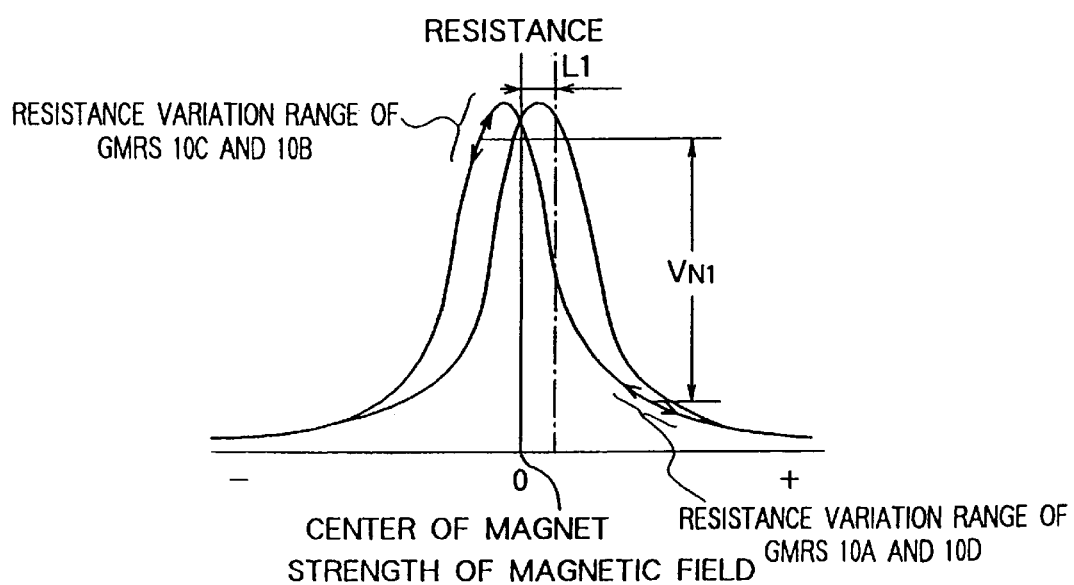
FIG. 7 is a characteristic diagram illustrating the change of resistance of the GMR device versus strength of a magnetic field at the second embodiment of the sensing device according to the present invention.

In the first embodiment described above, the Wheatstone bridge is constructed with GMR devices having hysteresis in resistance characteristics versus applied magnetic field. In contrast, in this embodiment, the GMR devices are disposed in such a manner that there is a deviation between the center of the magnetic field sensing plane of the GMR device and the center of the magnet so that the sensing operation occurs, in effect, at an operating point with a greater hysteresis, as shown in FIG. 7.

More specifically, as shown in FIG. 6b, the GMR device 10 is disposed so that the center of the magnetic field sensing plane 10b of the GMR device 10 is shifted by a predetermined amount $L_1$ from the center of the magnet 4 for example in a direction opposite to the rotation direction of the rotating member 2 of magnetic material. The specific value of $L_1$ is preferably within the range from 0.1 to 10 mm while the optimum value depends on the size of the GMR device. Except for the above point, the construction of the present embodiment is similar to that shown in FIGS. 1(a) and 1(b), and the circuit configuration is also similar to that shown in FIG. 2 or 3. Therefore, these figures are also referred to in the following description of the present embodiment.

The operation will be first described below with reference to FIGS. 8(a)–8(c).

If the rotary member of magnetic material 2 rotates, the magnetic field applied to the giant magnetoresistance devices 10A to 10D changes in response to the passage of the protruding and recessed portions of the rotary member of magnetic material 2 as shown in FIG. 8a, wherein the magnetic field applied to the magnetoresistance devices 10A and 10D is, in effect, opposite in phase to that applied to the magnetoresistance devices 10B and 10C. The above change in the magnetic field is detected by the magnetoresistance devices 10A and 10D, and also by the magnetoresistance devices 10B and 10C wherein the phase of the magnetic field detected by the magnetoresistance devices 10A and 10D becomes opposite to that detected by the magnetoresistance devices 10B and 10C. As a result, the overall magnitude of the change in the magnetic field becomes, in effect, four times greater than that which can be sensed by a single giant magnetoresistance device.

A corresponding change in resistance occurs in each giant magnetoresistance device. Thus, the giant magnetoresistance devices 10A and 10D have maximum and minimum resistances at locations opposite in phase to those where the giant magnetoresistance elements 10B and 10C have maximum and minimum resistances. As a result, the voltages at the nodes 18 and 19 (mid-point voltages) of the Wheatstone bridge circuit 11A also change in a similar fashion.

In the output signal of the GMR device which exhibits hysteresis in resistance characteristics versus applied magnetic field, there is a difference in the resistance variation range, as shown in FIG. 7, between the GMR devices 10A, 10D and the GMR devices 10C, 10B although the GMR devices 10A to 10D themselves operate in basically the same manner as shown in FIG. 4.

Thus, the deviation in the location of the center of magnetic field sensing plane of the GMR device relative to the center of the magnet leads to a greater difference, as shown in FIG. 7, in the output signal provided as the mid-point voltage $V_{N1}(>V_N)$ at the nodes 18, 19 of the Wheatstone bridge circuit 11A between the signal corresponding to the protruding portions and that corresponding to the recessed portions of the rotating member 2 of magnetic material.

The difference in the mid-point voltage is amplified by the differential amplifier 12. As shown in FIG. 8b, the differential amplifier 12 outputs a signal corresponding to the protruding and recessed portions of rotating member 2 of magnetic material shown in FIG. 8a. Thus, the output signal of the differential amplifier 12 is substantially four times greater than that obtained by a single GMR device.

The output of this differential amplifier 12 is applied to the comparator 13 so as to make comparison with the reference voltage $V_{T3}$ (which corresponds to $V_{T1}$, $V_{T2}$ described above). The comparator 13 outputs a "0" or "1" signal in accordance with the comparison result. The waveform of this signal is then shaped by the waveform shaping circuit 14. As a result, an output signal having a "0" or "1" level with sharp rising and falling edges is provided via the output terminal 15 as shown in FIG. 8c.

Thus the comparator 13 can compare the instantaneous value of the output of the differential amplifier 12 corresponding to the protruding and recessed portions of the rotating member 2 of magnetic material with the reference value $V_{T3}$ regardless of the edges in the output signal. This means that the differential amplifier 12 can start to provide an output signal precisely corresponding to the protruding and recessed portions of the rotating member 2 of magnetic material as soon as the electric power is turned on.

Although a Wheatstone bridge circuit constructed with GMR devices is employed in this specific embodiment, other similar bridge circuit configurations may also be employed.

In the present embodiment, as described above, the GMR device having a multilayer structure consisting of magnetic and non-magnetic layers whose thickness is optimized so that the resistance characteristics versus applied magnetic field has desirable hysteresis is disposed in such a manner that the center of the magnetic field sensing plane is shifted from the center of the magnet thereby achieving great hysteresis. This makes it possible to obtain a greater difference in the output signal of the Wheatstone voltage between the protruding portions and the recessed portions of the rotating member of magnetic material. As a result, when the electric power to the sensing device is turned on, the sensing device can immediately start a correct operation and provide an output signal precisely corresponding to the protruding and recessed portions of the rotating member of magnetic material. Thus, the sensing device according to the present embodiment has an instantaneous starting capability with high reliability.

Furthermore, the detection of the protruding and recessed portions of the rotating member of magnetic material is essentially based on the detection of the instantaneous value of the output of the differential amplifier. Therefore, in the present embodiment, it is not necessary to detect the edges of the protruding and recessed portions, and thus the holding circuit is no longer required.

Furthermore, it is possible to obtain a greater output signal level in the detecting operation. This leads to an improvement in the detection accuracy, and also leads to high resistance to external noise, or a high signal-to-noise ratio.

Embodiment 3

Figure 9A:
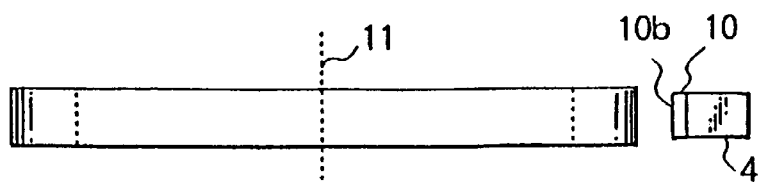
FIGS. 9(a)–9(b) are schematic diagrams illustrating a third embodiment of a sensing device according to the present invention.
Figure 9B:
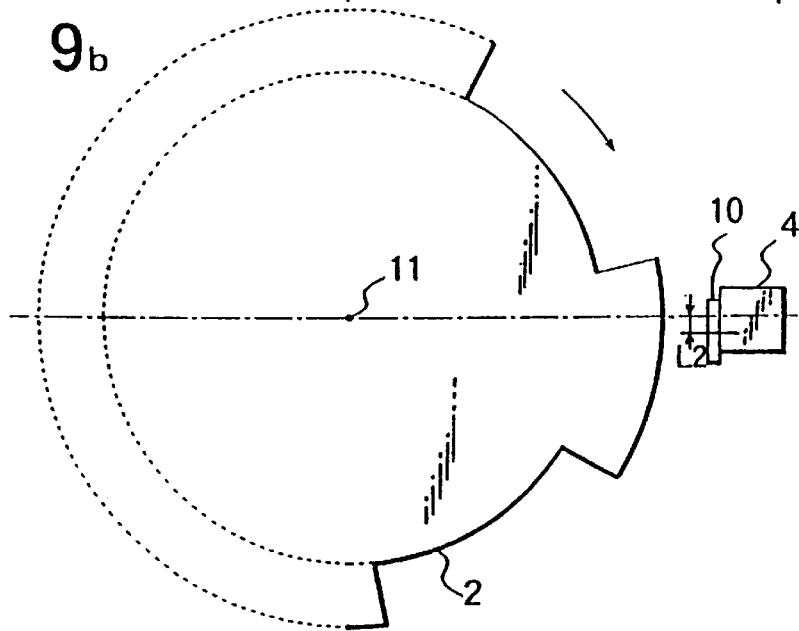

FIGS. 9(a) and 9(b) illustrate a third embodiment of the present invention, wherein its side view and plan view are shown in FIGS. 9a and 9b, respectively.

Figure 10:
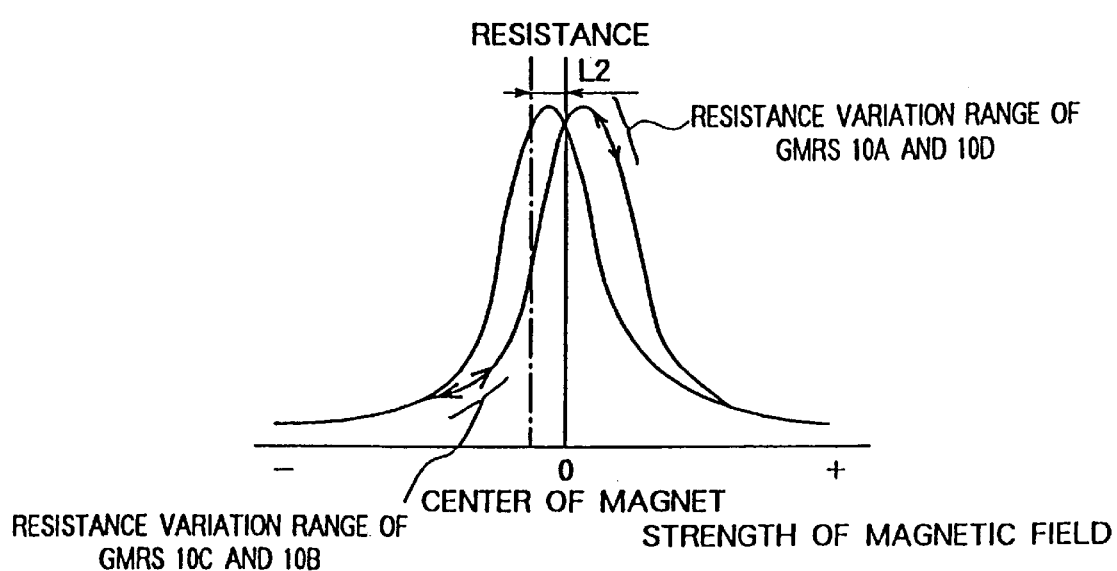
FIG. 10 is a characteristic diagram illustrating the change of resistance of the GMR device versus strength of a magnetic field in the third embodiment of the sensing device according to the present invention.

In the second embodiment described above, the GMR device having hysteresis in resistance characteristics versus applied magnetic field is disposed so that the center of the magnetic field sensing plane of the GMR device is shifted relative to the center of the magnet in a direction opposite to the rotation direction of the rotating member of magnetic material. In contrast, in the present embodiment, the GMR device is shifted in the same direction as the direction of rotation of the rotating member of magnetic material so that the sensing operation occurs at a greater hysteresis point as shown in FIG. 10.

More specifically, as shown in FIG. 9b, the GMR device 10 is disposed so that the center of the magnetic field sensing plane 10b of the GMR device 10 is shifted for example by a predetermined amount $L_2$ from the center of the magnet 4 in the same direction as the rotation direction of the rotating member 2 of magnetic material. The specific value of $L_2$ is preferably within the range of from 0.1 to 10 mm while the optimum value depends on the size of the GMR device. Except for the above point, the construction of the present embodiment is similar to that shown in FIGS. 1 and 6, and the circuit configuration is also similar to that shown in FIG. 2 or 3. Therefore, these figures are also referred to in the following description of the present embodiment. Excepting that the resistance variation ranges of the GMR devices 10A, 10D have characteristics reverse to those of GMR devices 10C, 10B as shown in FIGS. 7 and 10, the operation of the present embodiment is similar to that of the above embodiments.

In the present embodiment, as described above, the GMR device having a multilayer structure consisting of magnetic and non-magnetic layers whose thickness is optimized so that the characteristic of resistance versus applied magnetic field has desirable hysteresis is disposed in such a manner that the center of the magnetic field sensing plane is shifted from the center of the magnet thereby achieving great hysteresis. This makes it possible to obtain a greater difference in the output signal of the Wheatstone voltage between the protruding portions and the recessed portions of the rotating member of magnetic material. As a result, when the electric power to the sensing device is turned on, the sensing device can immediately start correct operation and provide an output signal precisely corresponding to the protruding and recessed portions of the rotating member of magnetic material. Thus, the sensing device according to the present embodiment has instantaneous starting capability with high reliability.

Furthermore, the detection of the protruding and recessed portions of the rotating member of magnetic material is essentially based on the detection of the instantaneous value of the output of the differential amplifier. Therefore, in the present embodiment, it is not necessary to detect the edges of the protruding and recessed portions, and thus the holding circuit is no longer required.

Furthermore, it is possible to obtain a greater output signal level in the detecting operation. This leads to an improvement in the detection accuracy, and also leads to high resistance to external noise, or a high signal-to-noise ratio.

Embodiment 4

Figure 11:
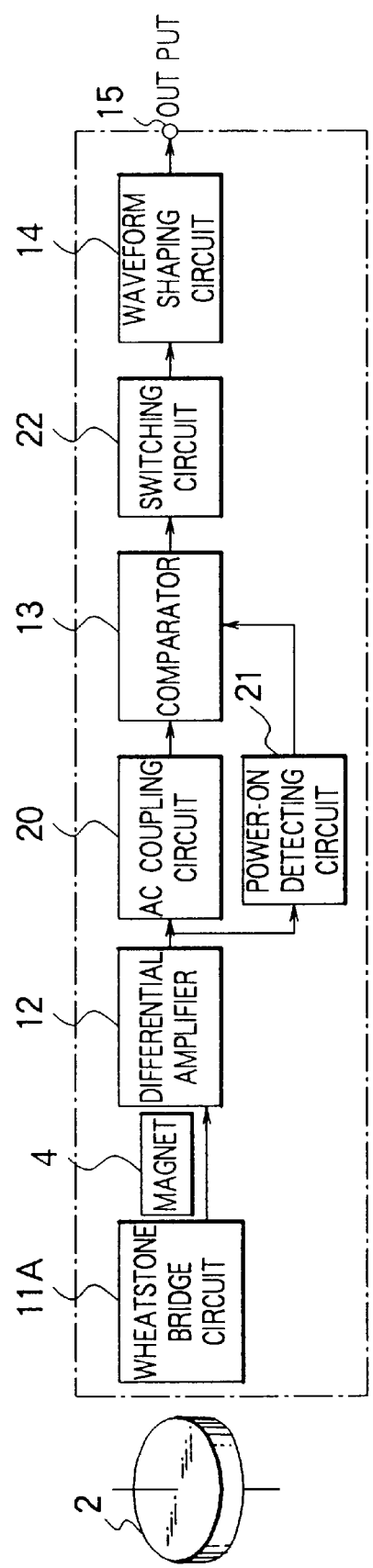
FIG. 11 is a block diagram illustrating a fourth embodiment of a sensing device according to the present invention.

FIG. 11 is a block diagram illustrating a fourth embodiment of the present invention in which similar elements and parts to those in FIG. 2 are denoted by similar reference numerals and will not be described here in further detail. In the present embodiment, the GMR device and the rotating member of magnetic material are disposed in a manner similar to the embodiment described above in connection with FIGS. 1(a) and 1(b), and thus the structure in terms of relative positions is not described here in further detail.

FIG. 11 is a block diagram illustrating a sensing device using the above-mentioned GMR device.

The sensing device includes: a Wheatstone bridge circuit 11A including a GMR device disposed a predetermined distance apart from a rotating member 2 of magnetic material so that a magnetic field is applied from a magnet to the GMR device; a differential amplifier 12 for amplifying the output signal of the Wheatstone bridge circuit 11A; an AC coupling circuit 20 serving as means for blocking the DC component of the output of the differential amplifier 12 and passing only the AC component; a comparator 13 for comparing the output of the AC coupling circuit 20 with a reference value and outputting a signal which has a "0" or "1" level depending on the comparison result; a power-on detecting circuit 21 for detecting a power-on operation on the basis of the output of the differential amplifier 12; a switching circuit 22 for selecting either the output of the comparator 13 or the output of the power-on detecting circuit 21 and outputting the selected output signal; and a waveform shaping circuit 14 for shaping the waveform of the output of the switching circuit 22 and supplying a "0" or "1" signal having sharp rising and falling edges to the output terminal 15. In the above construction of the sensing device, the Wheatstone bridge circuit 11A, differential amplifier 12, comparator 13, and waveform shaping circuit 14 form first detecting means, and the Wheatstone bridge circuit 11A, differential amplifier 12 and power-on detecting circuit 21 form second detecting means.

Figure 12:
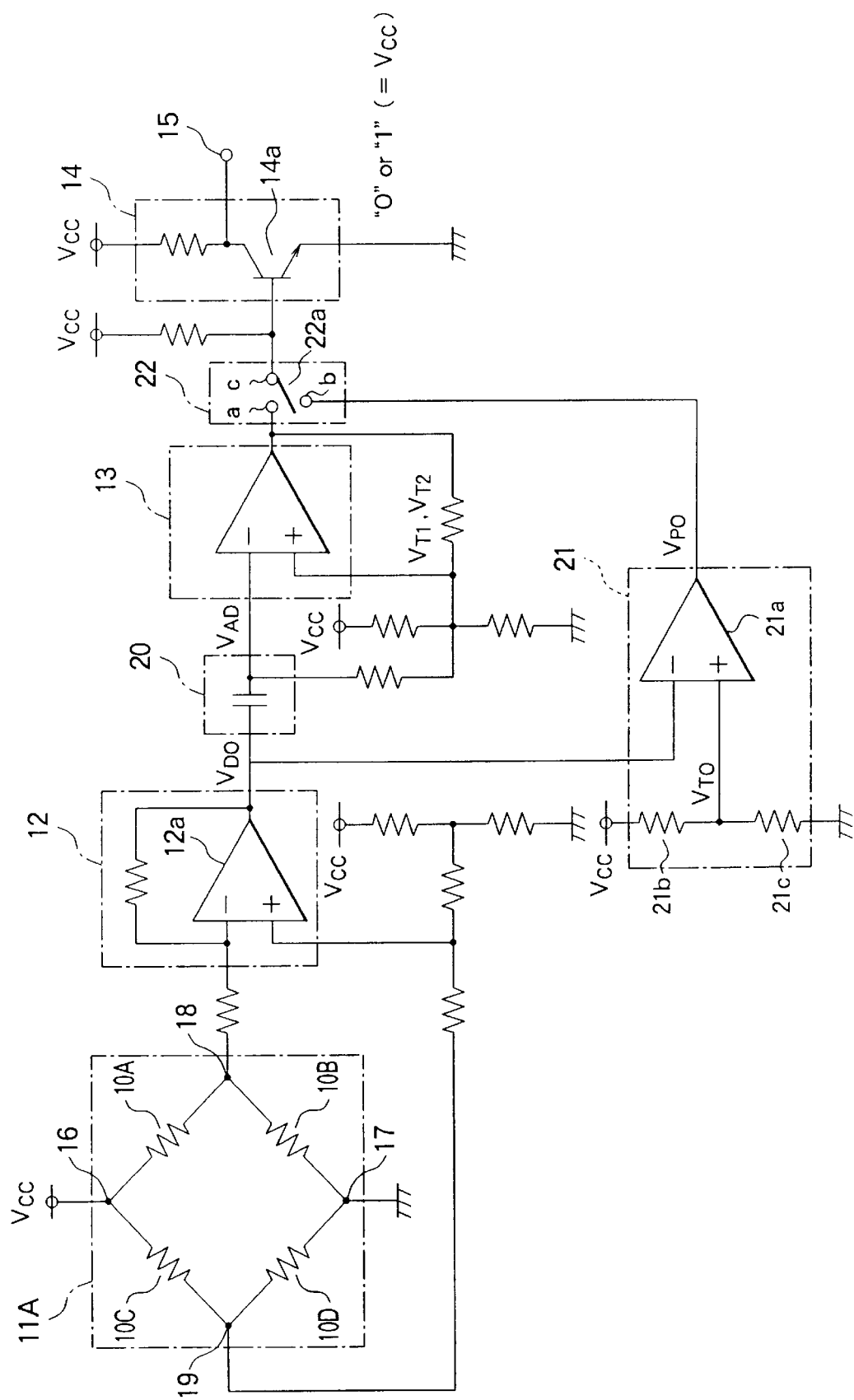
FIG. 12 is a circuit diagram illustrating a specific example of the circuit of FIG. 11.

FIG. 12 is a circuit diagram illustrating a specific example of the circuit shown in FIG. 11.

The Wheatstone bridge circuit 11A includes branches 10A, 10B, 10C, and 10D which are each formed with a giant magnetoresistance device. One end of the giant magnetoresistance device 10A and one end of the giant magnetoresistance device 10C are connected in common to each other, and the node 16 between these devices 10A and 10C is connected to the power supply terminal Vcc. One end of the giant magnetoresistance device 10B and one end of the giant magnetoresistance device 10D are connected in common to each other, and the node 17 between these devices 10B and 10D is grounded. The other ends of the giant magnetoresistance devices 10A and 10B are connected to a node 18, while the other ends of the giant magnetoresistance devices 10C and 10D are connected to a node 19.

The node 18 of the Wheatstone bridge circuit 11A is connected, via a resistor, to the inverting input of the amplifier 12a constituting the differential amplifier 12. The node 19 is connected, via a resistor, to the non-inverting input of the amplifier 12a wherein the non-inverting input of the amplifier 12a is further connected, via a resistor, to a voltage divider constituting a reference power supply.

The output terminal of the amplifier 12a is connected to the inverting input terminal of the comparator 13 via the AC coupling circuit 20 realized by for example a capacitor. The non-inverting input terminal of the comparator 13 is connected to a voltage dividing circuit which is constructed with resistors to serve as a reference voltage source. The non-inverting input terminal of the comparator 13 is also connected to the output terminal of the comparator 13 itself via another resistor. The output terminal of the amplifier 12a of the differential amplifier 12 is connected to the inverting input terminal of the amplifier 21a of the power-on detecting circuit 21. The non-inverting input terminal of the amplifier 21a is connected to the node of the voltage dividing resistors 21b and 21c disposed between the power supply terminal Vcc and ground.

The output terminal of the comparator 13 is connected to the fixed terminal a of the switch circuit 22. The output terminal of the power-on detecting circuit 21 is connected to the fixed terminal b of the switch circuit 22. The terminal c of the switch circuit 22 is connected to the base of the transistor 14a of the waveform shaping circuit 14. The collector of the transistor 14a is connected to the output terminal 15. The collector of the transistor 14a is also connected to the power supply terminal Vcc via a resistor. The emitter of the transistor 14a is grounded. When the electric power is turned on, that is, when a power-on operation is detected by the power-on detecting circuit, the movable switch 22(a) is switched so that the fixed terminal b is selected. If a predetermined length of time has passed after that, the movable switch 22(a) is automatically switched to the fixed terminal a.

The operation will be firstly described below with reference to FIGS. 13(a)–13(c).

Figure 13:
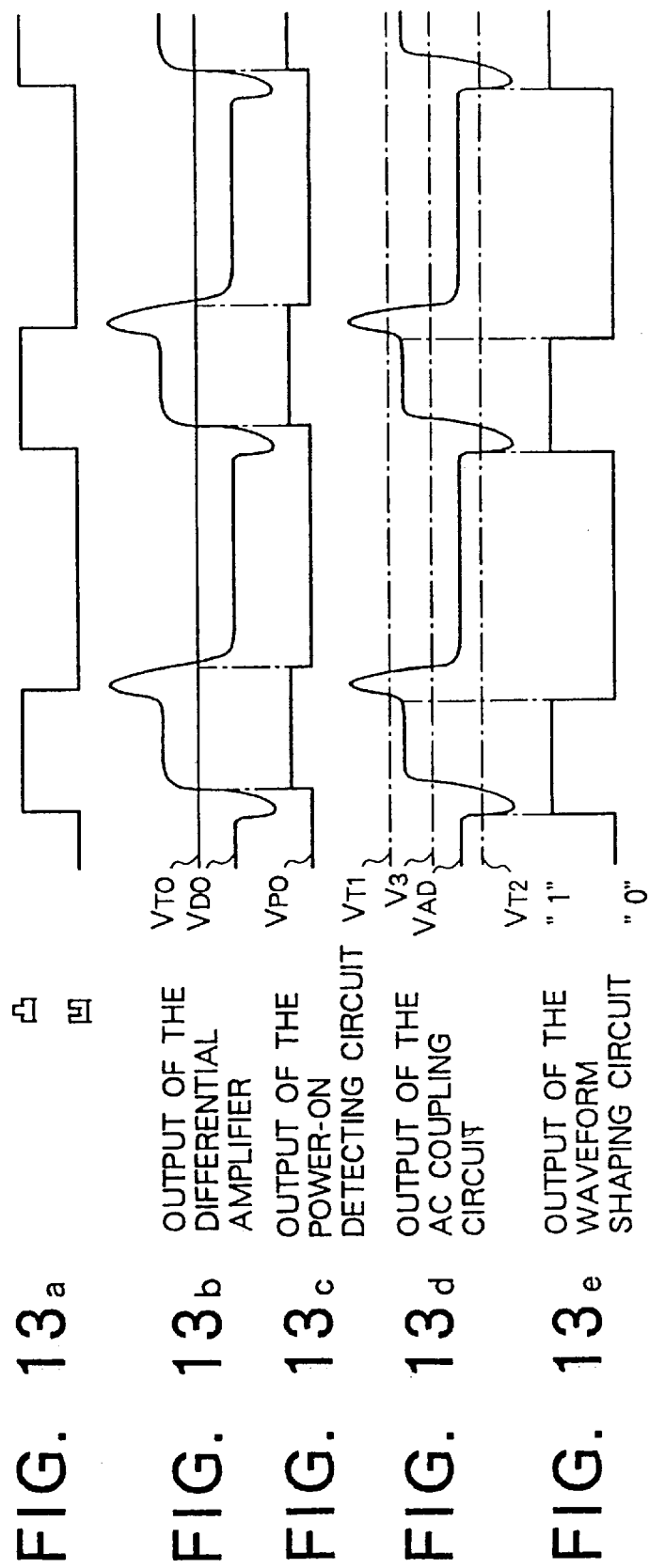
FIGS. 13(a)–13(e) are waveform diagrams illustrating the operation relating to the fourth embodiment of the sensing device according to the present invention.

If the rotary member of magnetic material 2 rotates, the magnetic field applied to the giant magnetoresistance devices 10A to 10D changes in response to the passage of the protruding and recessed portions of the rotary member of magnetic material 2 as shown in FIG. 13(a), wherein the magnetic field applied to the magnetoresistance devices 10A and 10D is, in effect, opposite in phase to that applied to the magnetoresistance devices 10B and 10C. The above change in the magnetic field is detected by the magnetoresistance devices 10A and 10D, and also by the magnetoresistance devices 10B and 10C wherein the phase of the magnetic field detected by the magnetoresistance devices 10A and 10D becomes opposite to that detected by the magnetoresistance devices 10B and 10C. As a result, the overall magnitude of the change in the magnetic field becomes, in effect, four times greater than that which can be sensed by a single giant magnetoresistance device.

A corresponding change in resistance occurs in each giant magnetoresistance device. Thus, the giant magnetoresistance devices 10A and 10D have maximum and minimum resistances at locations opposite in phase to those where the giant magnetoresistance elements 10B and 10C have maximum and minimum resistances. As a result, the voltages at the nodes 18 and 19 (mid-point voltages) of the Wheatstone bridge circuit 11A also change in a similar fashion.

The difference in the mid-point voltage is amplified by the differential amplifier 12. As shown in FIG. 13(b), the differential amplifier 12 outputs a signal $V_{D0}$ corresponding to the protruding and recessed portions of rotating member 2 of magnetic material shown in FIG. 13(a). Thus, the output signal of the differential amplifier 12 is substantially four times greater than that obtained by a single GMR device.

The output of the differential amplifier 12 is supplied to the inverting input terminal of the amplifier 21a of the power-on detecting circuit 21 so as to make a comparison with a reference value $V_{T0}$ given at the non-inverting input terminal from the voltage dividing resistors 21b and 21c. When the level of the output of the differential amplifier 12 is greater than the reference value $V_{T0}$, the power-on detecting circuit 21 generates a high-level output signal $V_{P0}$ as shown in FIG. 13(c). The output signal $V_{P0}$ is supplied to the waveform shaping circuit 14 via the fixed terminal b of the switching circuit 22. The waveform shaping circuit 14 shapes the received waveform and outputs the resultant signal to the output terminal 15. This makes it possible to obtain an output signal which precisely corresponds to the protruding and recessed portions of the rotating member of magnetic material as soon as the electric power of the sensing device is turned on, that is, it is possible to achieve an instant starting operation with high reliability.

As described above, the switching circuit 22 is switched to the fixed terminal a when a predetermined length of time has elapsed after the detection of the turning-on of the electric power. After that, therefore, the DC component (offset component) of the output $V_{D0}$ of the differential amplifier 12 is blocked by the AC coupling circuit 20, and thus the resultant output VAD includes only an AC component as shown in FIG. 13(e). In FIG. 13e, $V_3$ denotes the reference voltage of the AC coupling circuit 20, wherein $V_3$ is substantially equal to 0 V. The output VAD of the AC coupling circuit 20 is supplied to the comparator 13 and is compared with the reference voltages $V_{T1}$ and $V_{T2}$. The comparator 13 outputs a "0" or "1" signal in accordance with the comparison result. The resultant signal is then supplied to the waveform shaping circuit 14 via the fixed terminal of the switching circuit 22 so as to shape its waveform. As a result, an output signal having a "0" or "1" level with sharp rising and falling edges is obtained via the output terminal 15, as shown in FIG. 13(d).

Although a Wheatstone bridge circuit constructed with GMR devices is employed in this specific embodiment, other similar bridge circuit configurations may also be employed.

In the present embodiment, as described above, The differential output of the Wheatstone bridge circuit constructed with the GMR devices is amplified by the differential amplifier and then supplied to the comparator via the AC coupling circuit. This ensures that the output signal precisely corresponds to the protruding and recessed portions of the rotating member of magnetic material over the entire operating temperature. Furthermore, in the case where a power-on operation is detected, the output signal of the Wheatstone bridge circuit constructed with GMR devices having hysteresis in resistance characteristics versus applied magnetic field is processed by the power-on detecting circuit without passing the signal through the AC coupling circuit thereby making it possible to obtain an output signal which precisely corresponds to the protruding and recessed portions of the rotating member of magnetic material as soon as the electric power of the sensing device is turned on, thus making it possible to achieve instantaneous starting operation with high reliability.

Furthermore, the detection of the protruding and recessed portions of the rotating member of magnetic material is essentially based on the detection of the instantaneous value of the output of the differential amplifier. Therefore, in the present embodiment, it is not required to detect the edges of the protruding and recessed portions, and thus the holding circuit is no longer required.

Furthermore, also in this embodiment, the GMR device may be disposed in such a manner that there is a deviation between the center of the magnetic field sensing plane of the GMR device and the center of the magnet so as to obtain a greater difference in the output of the Wheatstone bridge circuit between the protruding and recessed portions of the rotating member of magnetic material, which makes it possible for the sensing device to operate at an operating point having greater hysteresis.

Embodiment 5

Figure 14:
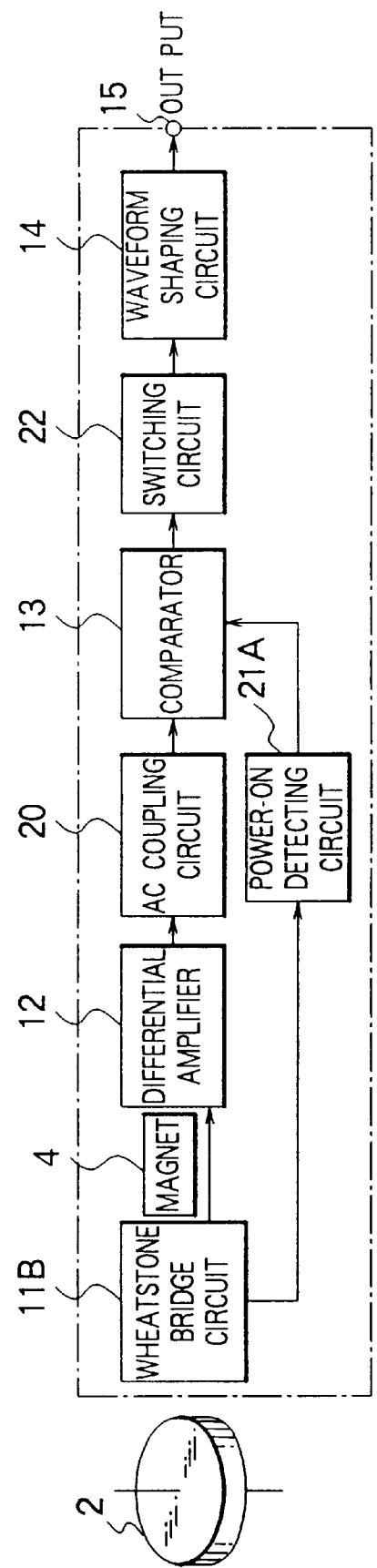
FIG. 14 is a block diagram illustrating a fifth embodiment of a sensing device according to the present invention.

FIG. 14 is a block diagram illustrating a fifth embodiment of the present invention, in which similar elements and parts to those in FIG. 11 are denoted by similar reference numerals and will not be described here in further detail. In the present embodiment, the GMR device and the rotating member of magnetic material are disposed in such a manner that they have relative positions similar to those shown in FIGS. 1(a) and 1(b), and thus the structure in terms of the location is not described here in further detail. However, in the present embodiment, commonly-used GMR devices having no hysteresis are employed, as opposed to the first to fourth embodiments described above in which GMR devices having hysteresis are employed.

In the fourth embodiment described above, when a power-on operation is detected, the output signal of the Wheatstone bridge circuit with GMR device having hysteresis in resistance characteristics versus applied magnetic field is directly processed, without going through the AC coupling circuit, by the power-on detecting circuit, while the operation mode is switched after passage of a predetermined length of time so that the signal passes through the AC coupling circuit thereby ensuring that the output signal precisely corresponds to the protruding and recessed portions of the rotating member. In contrast, in the present embodiment, the instantaneous starting capability is achieved using GMR devices having no such hysteresis. A fixed resistor is connected in series to GMR devices for detecting the change in the magnetic field caused by the protruding and recessed portions of the rotating member of magnetic material so that the resistance of the GMR devices can be detected via this resistor during a starting operation immediately after the electric power is turned on.

FIG. 14 is a block diagram illustrating a sensing device using an ordinary GMR device having no hysteresis.

The sensing device includes: a Wheatstone bridge circuit 11B including an ordinary GMR device having no hysteresis disposed a predetermined distance apart from a rotating member 2 of magnetic material so that a magnetic field is applied from a magnet to the GMR device; a differential amplifier 12 for amplifying the output signal of the Wheatstone bridge circuit 11B; an AC coupling circuit 20 serving as means for blocking the DC component of the output of the differential amplifier 12 and passing only the AC component; a comparator 13 for comparing the output of the AC coupling circuit 20 with a reference value and outputting a signal which has a "0" or "1" level depending on the comparison result; a power-on detecting circuit 21A for detecting a power-on operation on the basis of the mid-point voltage of the Wheatstone bridge circuit 11B; a switching circuit 22 for selecting either the output of the comparator 13 or the output of the power-on detecting circuit 21A and outputting the selected output signal; and a waveform shaping circuit 14 for shaping the waveform of the output of the switching circuit 22 and supplying a "0" or "1" signal having sharp rising and falling edges to the output terminal 15. In the above construction of the sensing device, the Wheatstone bridge circuit 11B, differential amplifier 12, comparator 13, and waveform shaping circuit 14 form first detecting means, and the Wheatstone bridge circuit 11B and power-on detecting circuit 21A form second detecting means.

Figure 15:
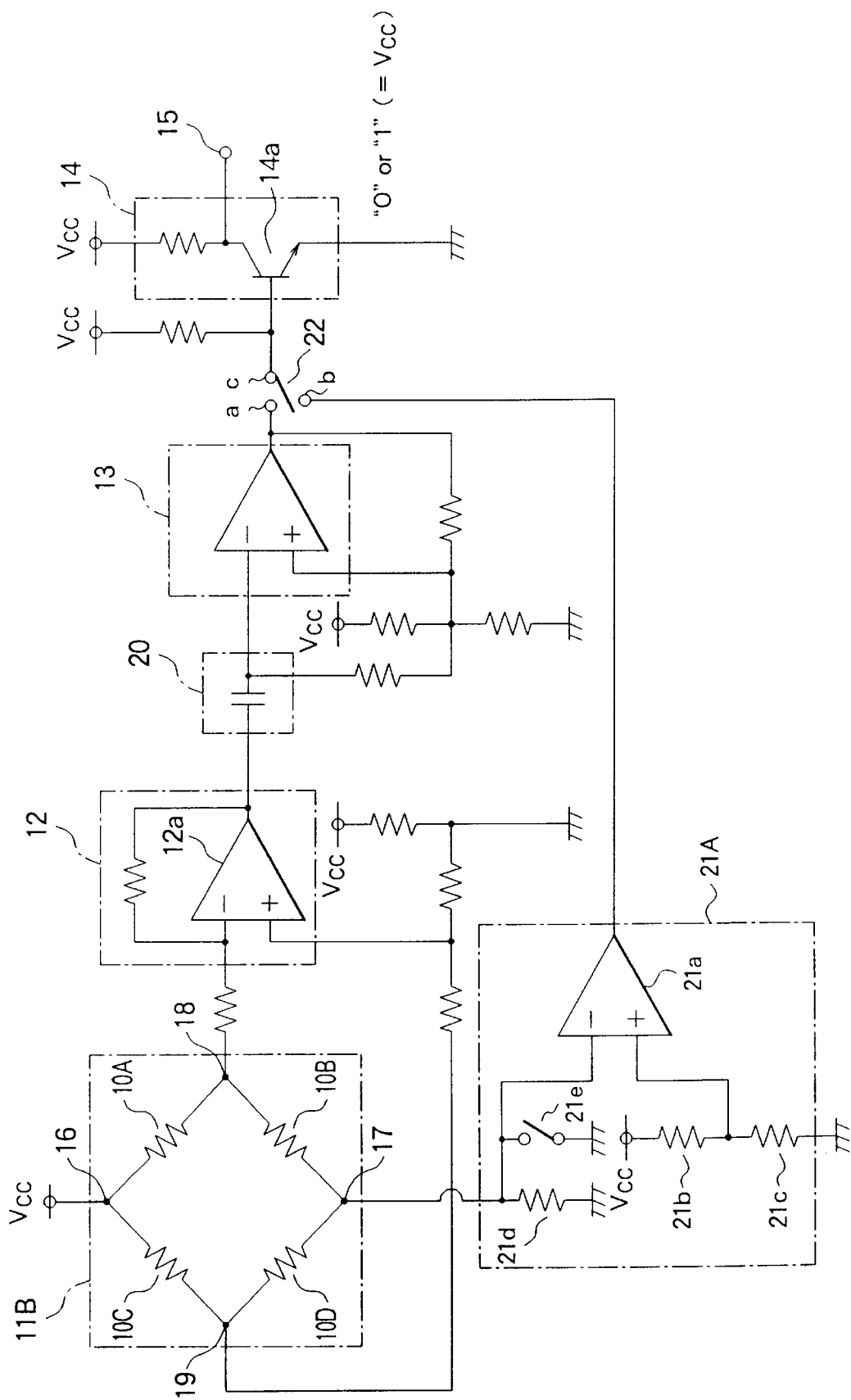
FIG. 15 is a circuit diagram illustrating a specific example of the circuit of FIG. 14.

FIG. 15 is a circuit diagram illustrating a specific example of the circuit shown in FIG. 14.

The Wheatstone bridge circuit 11B includes branches 10A, 10B, 10C, and 10D which are each formed with a giant magnetoresistance device. One end of the giant magnetoresistance device 10A and one end of the giant magnetoresistance device 10C are connected in common to each other, and the node 16 between these devices 10A and 10C is connected to the power supply terminal Vcc. One end of the giant magnetoresistance device 10B and one end of the giant magnetoresistance device 10D are connected in common to each other, and the node 17 between these devices 10B and 10D is grounded. The other ends of the giant magnetoresistance devices 10A and 10B are connected to a node 18, while the other ends of the giant magnetoresistance devices 10C and 10D are connected to a node 19.

The node 18 of the Wheatstone bridge circuit 11B is connected, via a resistor, to the inverting input of the amplifier 12a constituting the differential amplifier 12. The node 19 is connected, via a resistor, to the non-inverting input of the amplifier 12a wherein the non-inverting input of the amplifier 12a is further connected, via a resistor, to a voltage divider constituting a reference power supply.

The output terminal of the amplifier 12a is connected to the inverting input terminal of the comparator 13 via the AC coupling circuit 20 realized by for example a capacitor. The non-inverting input terminal of the comparator 13 is connected to a voltage dividing circuit which is constructed with resistors to serve as a reference voltage source. The non-inverting input terminal of the comparator 13 is also connected to the output terminal of the comparator 13 itself via another resistor.

Furthermore, the inverting input terminal of the amplifier 21a of the power-on detecting circuit 21A is connected to one end of the resistor 21d serving as a power-on detecting fixed-resistor connected between ground and the node 17 of the Wheatstone bridge circuit 11B. The non-inverting input terminal of the amplifier 21a is connected to the node of the voltage dividing resistors 21b and 21c disposed between the power supply terminal Vcc and ground. Furthermore, the switch 21e is connected in parallel to the resistor 21d. Furthermore, the switch 21e is in an off-state when the electric power is turned on or when a power-on operation is detected. When a predetermined length of time has elapsed, the switch 21e is automatically turned on.

The output terminal of the comparator 13 is connected to the fixed terminal a of the switch circuit 22. The output terminal of the power-on detecting circuit 21A is connected to the fixed terminal b of the switch circuit 22. The movable terminal c of the switch circuit 22 is connected to the base of the transistor 14a of the waveform shaping circuit 14. The collector of the transistor 14a is connected to the output terminal 15. The collector of the transistor 14a is also connected to the power supply terminal Vcc via a resistor. The emitter of the transistor 14a is grounded. When the electric power is turned on, that is, when a power-on operation is detected by the power-on detecting circuit, the movable switch 22a is switched so that the fixed terminal b is selected. If a predetermined length of time has passed after that, the movable switch 22a is automatically switched to the fixed terminal a.

Now, the operation will be described below. Except for the starting operation immediately after the electric power is turned on, the operation is performed in a manner similar to the previous embodiment described above in connection with FIG. 12, and therefore such similar operation is not described here in further detail.

At the moment when the electric power of the sensing device is turned on, the resistance of each GMR device 10A–10D constituting the Wheatstone bridge circuit 11B varies depending on the location of the protruding and recessed portions of the rotating member 2 of magnetic material (refer to FIG. 1) and a corresponding variation occurs in the overall resistance.

That is, the overall resistance of the Wheatstone bridge corresponding to protruding portions of the rotating member 2 of magnetic material is different from that corresponding to recessed portions. The above change in the overall resistance produces a change in the voltage across the resistor 21d serving as the power-on detecting fixed-resistor. Thus, the change in the overall resistance is detected as a change in the voltage across the resistor 21d. The detected voltage signal is supplied to the inverting input terminal of the amplifier 21a of the power-on detecting circuit 21A so as to make a comparison with the reference value (comparison reference level) applied to the non-inverting input terminal from the dividing resistors 21b and 21c.

When the voltage level across the resistor 21d is greater than the reference value, the power-on detecting circuit 21A outputs a high-level signal, which is supplied to the waveform shaping circuit 14 via the fixed terminal b of the switching circuit 22. The waveform shaping circuit 14 shapes the received signal and outputs the resultant signal to the output terminal 15. As a result, a correct signal precisely corresponding to the protruding and recessed portions of the rotating member 2 of magnetic material can be obtained as soon as the electric power of the sensing device is turned on.

When a predetermined length of time has passed after the power-on detection, the switch 21e is turned on so that the node 17 of the Wheatstone bridge circuit 11B is grounded. At the same time, the switching circuit 22 is switched so that the fixed terminal "a" is selected. After that, an output signal corresponding to the protruding and recessed portions of the rotating member 2 of magnetic material can thus be obtained in a manner similar to the previous embodiments.

Also in this embodiment, the Wheatstone bridge circuit is constructed with GMP devices. However, other similar bridge circuit configurations may also be employed.

In the present embodiment, as described above, the correct starting operation is achieved using GMR devices which do not exhibit hysteresis. To this end, the fixed resistor is connected in series to the GMR devices serving to detect the change in magnetic field corresponding to the protruding and recessed portions of the rotating member of magnetic material so that the resistance of GMR devices is detected via this fixed resistor during the starting operation after the electric power is turned on. Thus, the voltage across this resistance is detected via the power-on detecting circuit and an output signal precisely corresponding to the protruding and recessed portions of the rotating member of magnetic material can be obtained as soon as the electric power of the sensing device is turned on. Thus, the sensing device according to the present embodiment has an instantaneous starting capability with high reliability.

Furthermore, the detection of the protruding and recessed portions of the rotating member of magnetic material is essentially based on the detection of the instantaneous value of the output of the differential amplifier. Therefore, in the present embodiment, it is not required to detect the edges of the protruding and recessed portions, and thus the holding circuit is no longer required.

Furthermore, the signal detected by the GMR devices is processed after passing it through the AC coupling circuit so as to obtain a final output signal which always precisely corresponds to the protruding and recessed portions of the rotating member of magnetic material over the entire operating temperature range regardless of the temperature coefficients of the GMR devices constituting the bridge circuit.

Furthermore, a device having resistance hysteresis as referred to in the foregoing embodiments may be used as the GMR device.

Furthermore, also in this embodiment, the GMR device may be disposed in such a manner that there is a deviation between the center of the magnetic field sensing plane of the GMR device and the center of the magnet so as to obtain a greater difference in the output of the Wheatstone bridge circuit between the protruding and recessed portions of the rotating member of magnetic material, which makes it possible for the sensing device to operate in a magnetic field range in which resistance of the GMR device have great hysteresis.

Embodiment 6

Figure 16:
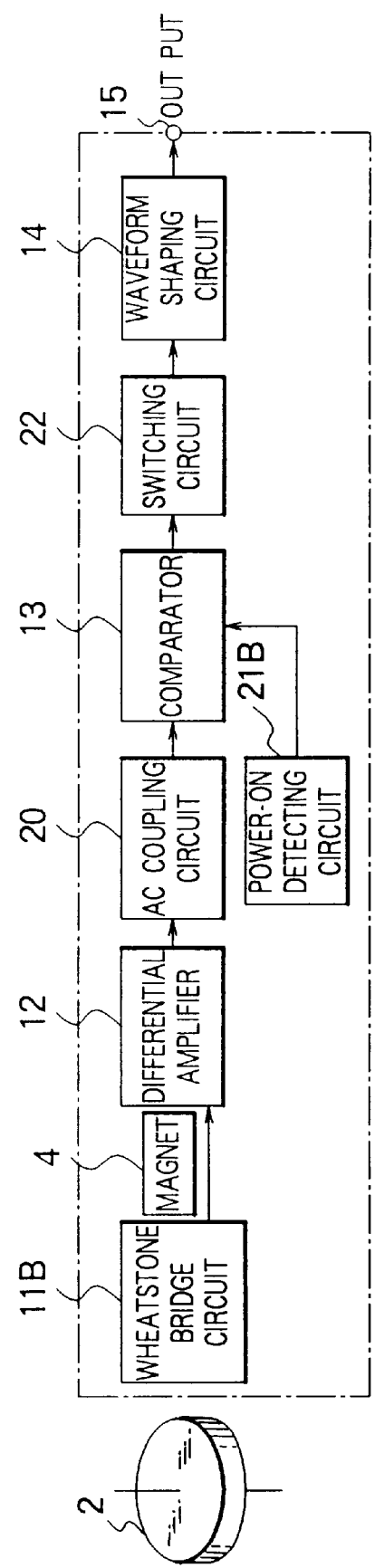
FIG. 16 is a block diagram illustrating a sixth embodiment of a sensing device according to the present invention.

FIG. 16 is a block diagram illustrating a sixth embodiment of the present invention, in which similar elements and parts to those in FIG. 14 are denoted by similar reference numerals, and will not be described here in further detail. In the present embodiment, the GMR device and the rotating member of magnetic material are disposed in such a manner that they have relative positions similar to those shown in FIGS. 1(a) and 1(b), and thus the structure in terms of the location is not described here in further detail. However, in the present embodiment, commonly-used GMR devices having no hysteresis are employed, as opposed to the first to fourth embodiments described above in which GMR devices having hysteresis are employed.

In the fifth embodiment described above, the instantaneous starting capability is achieved by employing a circuit configuration in which a fixed resistor is connected in series to GMR devices for detecting the change in the magnetic field caused by the protruding and recessed portions of the rotating member of magnetic material so that the resistance of the GMR devices can be detected via this resistor during a starting operation immediately after the electric power is turned on. In the present embodiment, in addition to the GMR devices for detecting the change in magnetic field caused by the protruding and recessed portions of the rotating member of magnetic material, an additional GMR device is provided for use in a starting operation immediately after the electric power is turned on.

FIG. 16 is a block diagram illustrating a sensing device using an ordinary GMR device having no hysteresis.

The sensing device includes: a Wheatstone bridge circuit 11B including an ordinary GMR device having no hysteresis disposed a predetermined distance apart from a rotating member 2 of magnetic material so that a magnetic field is applied from a magnet to the GMR device; a differential amplifier 12 for amplifying the output signal of the Wheatstone bridge circuit 11B; an AC coupling circuit 20 serving as means for blocking the DC component of the output of the differential amplifier 12 and passing only the AC component; a comparator 13 for comparing the output of the AC coupling circuit 20 with a reference value and outputting a signal which has a "0" or "1" level depending on the comparison result; a power-on detecting circuit 21B for detecting a power-on operation on the basis of the output of a GMR device which is additionally provided; a power-on detecting circuit 21B for detecting a power-on operation on the basis of the mid-point voltage of of the Wheatstone bridge circuit 11B; a switching circuit 22 for selecting either the output of the comparator 13 or the output of the power-on detecting circuit 21B and outputting the selected output signal; and a waveform shaping circuit 14 for shaping the waveform of the output of the switching circuit 22 and supplying a "0" or "1" signal having sharp rising and falling edges to the output terminal 15. In the above construction of the sensing device, the Wheatstone bridge circuit 11B, differential amplifier 12, comparator 13, and waveform shaping circuit 14 form first detecting means, and the power-on detecting circuit 21B forms second detecting means.

Figure 17:
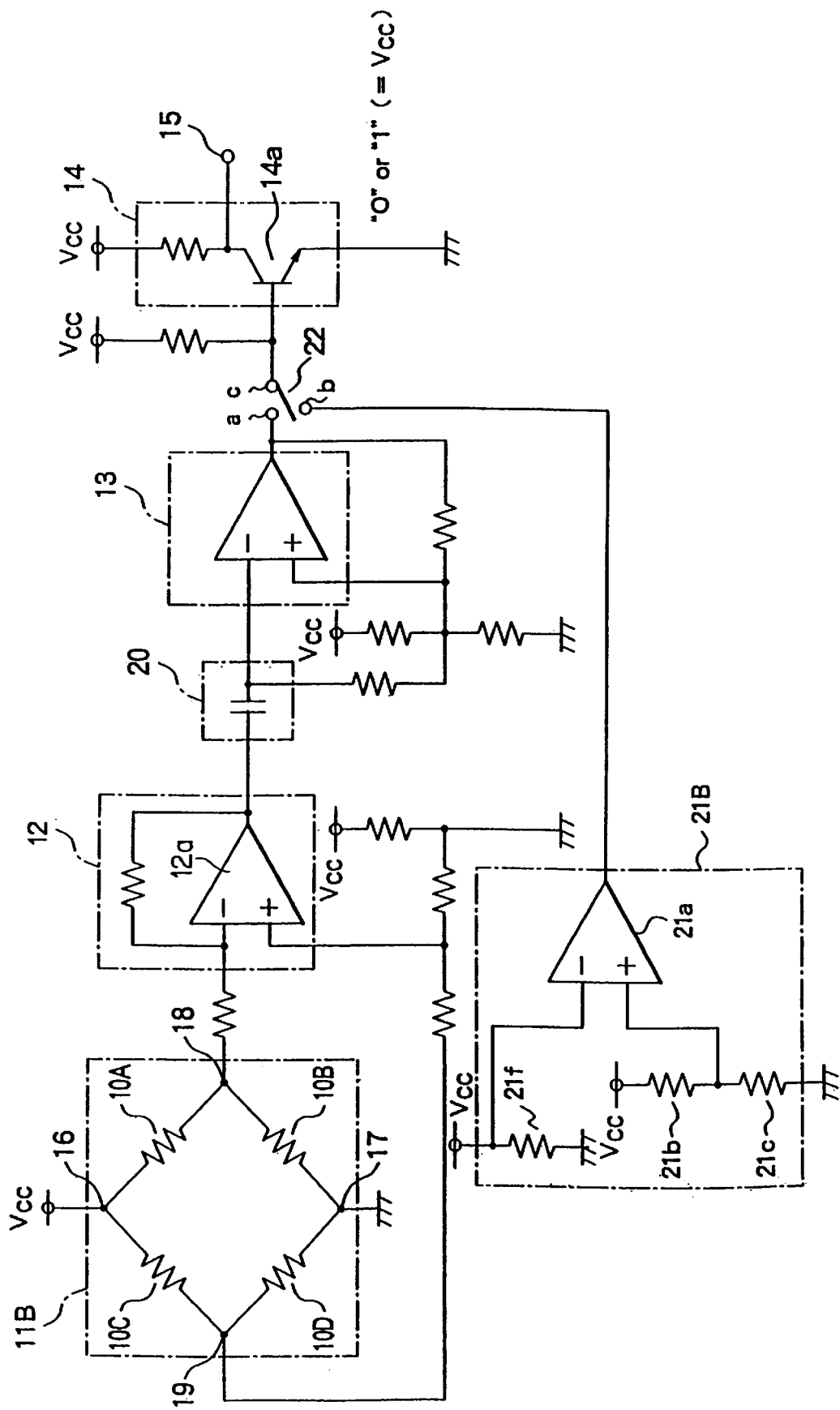
FIG. 17 is a circuit diagram illustrating a specific example of the circuit of FIG. 16.

FIG. 17 is a circuit diagram illustrating a specific example of the circuit shown in FIG. 16.

The Wheatstone bridge circuit 11B includes branches 10A, 10B, 10C, and 10D which are each formed with a giant magnetoresistance device. One end of the giant magnetoresistance device 10A and one end of the giant magnetoresistance device 10C are connected in common to each other, and the node 16 between these devices 10A and 10C is connected to the power supply terminal Vcc. One end of the giant magnetoresistance device 10B and one end of the giant magnetoresistance device 10D are connected in common to each other, and the node 17 between these devices 10B and 10D is grounded. The other ends of the giant magnetoresistance devices 10A and 10B are connected to a node 18, while the other ends of the giant magnetoresistance devices 10C and 10D are connected to a node 19.

The node 18 of the Wheatstone bridge circuit 11B is connected, via a resistor, to the inverting input of the amplifier 12a constituting the differential amplifier 12. The node 19 is connected, via a resistor, to the non-inverting input of the amplifier 12a wherein the non-inverting input of the amplifier 12a is further connected, via a resistor, to a voltage divider constituting a reference power supply.

The output terminal of the amplifier 12a is connected to the inverting input terminal of the comparator 13 via the AC coupling circuit 20 realized by for example a capacitor. The non-inverting input terminal of the comparator 13 is connected to a voltage dividing circuit which is constructed with resistors to serve as a reference voltage source. The non-inverting input terminal of the comparator 13 is also connected to the output terminal of the comparator 13 itself via another resistor.

Furthermore, the inverting input terminal of the amplifier 21a of the power-on detecting circuit 21B is connected to one end of an additional GMR device 21f serving as a power-on detecting device connected between ground and the power supply terminal Vcc. The non-inverting input terminal of the amplifier 21a is connected to the node of the voltage dividing resistors 21b and 21c disposed between the power supply terminal Vcc and ground.

The output terminal of the comparator 13 is connected to the fixed terminal a of the switch circuit 22. The output terminal of the power-on detecting circuit 21B is connected to the fixed terminal b of the switch circuit 22. The movable terminal c of the switch circuit 22 is connected to the base of the transistor 14a of the waveform shaping circuit 14. The collector of the transistor 14a is connected to the output terminal 15. The collector of the transistor 14a is also connected to the power supply terminal Vcc via a resistor. The emitter of the transistor 14a is grounded. The GMR devices 10A–10D form a first magnetic field sensing element, the GMR device 21f forms a second magnetic field sensing element.

Now, the operation will be described below. Except for the starting operation immediately after the electric power is turned on, the operation is performed in a manner similar to the previous embodiment described above in connection with FIG. 12, and therefore such similar operation is not described here in further detail.

At the moment when the electric power of the sensing device is turned on, the voltage corresponding to the resistance of the GMR device 21f dedicated to the starting operation is supplied to the inverting input terminal of the amplifier 21a of the power-on detecting circuit 21B so that the voltage corresponding to the location of the protruding and recessed portions of the rotating member 2 of magnetic material (refer to FIGS. 1(a) and 1(b) is compared with the reference value (comparison reference level) given at the non-inverting input terminal from the dividing resistors 21b and 21c.

If the voltage level across the resistor 21f is greater than the reference value, the power-on detecting circuit 21B outputs a high-level signal to the waveform shaping circuit 14 via the fixed terminal b of the switching circuit 22. This makes it possible to obtain an output signal which precisely corresponds to the protruding and recessed portions of the rotating member of magnetic material as soon as the electric power of the sensing device is turned on.

When a predetermined length of time has elapsed after the power-on detection, the switching circuit 22 is switched to the fixed terminal 2 so that the output signal corresponding to the protruding and recessed portions of the rotating member 2 of magnetic material can be obtained in a manner similar to the previous embodiments.

Although a Wheatstone bridge circuit constructed with GMR devices is employed in this specific embodiment, other similar bridge circuit configurations may also be employed.

As described above, in the present embodiment, in addition to the GMR devices for detecting the change in magnetic field caused by the protruding and recessed portions of the rotating member of magnetic material, an additional GMR device is provided for exclusive use in a starting operation immediately after the electric power is turned on so that the voltage corresponding to the resistance of the additional GMR device is detected via the power-on detecting circuit. This makes it possible to obtain an output signal which precisely corresponds to the protruding and recessed portions of the rotating member of magnetic material as soon as the electric power of the sensing device is turned on, that is, it is possible to achieve instantaneous starting operation with high reliability.

Furthermore, the detection of the protruding and recessed portions of the rotating member of magnetic material is essentially based on the detection of the instantaneous value of the output of the differential amplifier. Therefore, in the present embodiment, it is not required to detect the edges of the protruding and recessed portions, and thus the holding circuit is no longer required.

Furthermore, the signal detected by the GMR devices is also processed after passing it through the AC coupling circuit so as to obtain a final output signal which always precisely corresponds to the protruding and recessed portions of the rotating member of magnetic material over the entire operating temperature range regardless of the temperature coefficients of the GMR devices constituting the bridge circuit.

Embodiment 7

Figure 18:
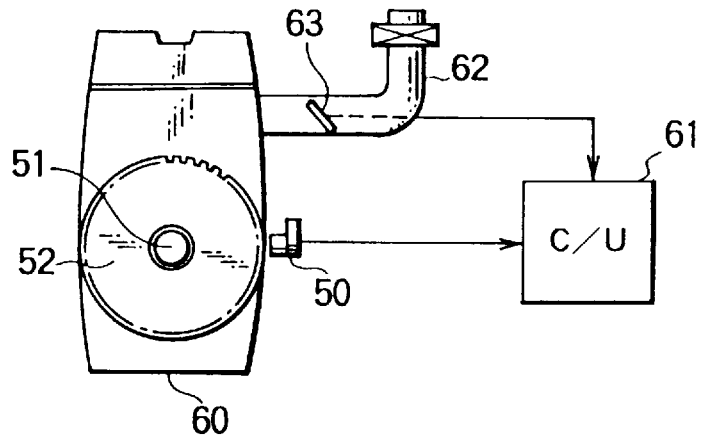
FIG. 18 is a sectional side view illustrating a seventh embodiment of a sensing device according to the present invention.
Figure 19:
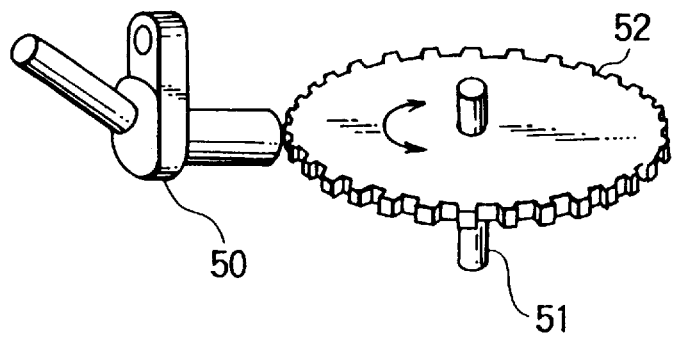
FIG. 19 is a perspective view illustrating the relative positions of the main part of the sensing device and a rotary member of magnetic material in the seventh embodiment according to the present invention.
Figure 20:
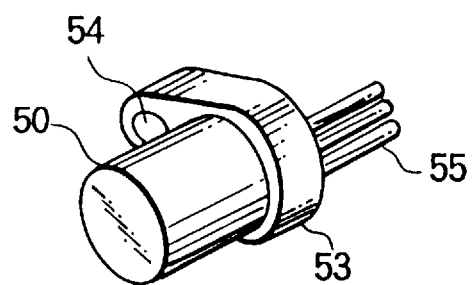
FIG. 20 is a perspective view illustrating the main part of the sensing device of the seventh embodiment according to the present invention.
Figure 21:
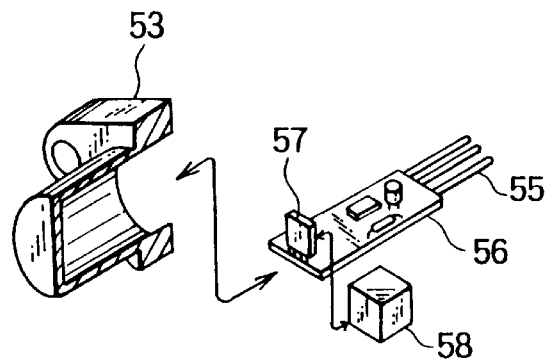
FIG. 21 is an exploded view illustrating the internal structure of the main part of the sensing device of the seventh embodiment according to the present invention.

FIGS. 18 to 21 illustrate seventh embodiment of the invention, in which the invention is applied to an internal combustion engine. FIG. 18 is a schematic diagram illustrating the construction of the entire system of the embodiment. FIG. 19 is a perspective view illustrating the relative positions of the main part of a sensing device and a rotary member of magnetic material. FIG. 20 is a perspective view illustrating the main part of the sensing device, and FIG. 21 illustrates the internal structure thereof. As shown in these figures, the main part of the sensing device 50 is disposed at a location adjacent to the internal combustion engine 60. A rotary member of magnetic material 52 serving as a signal plate is disposed on a crank shaft or a cam shaft of the engine 60 serving as a rotation shaft 51 so that the rotary member of magnetic material 52 can rotate in synchronization with the rotation shaft 51 wherein the rotary member of magnetic material 52 has at least one protruding or recessed portion as in the above-described rotary member of magnetic material 2.

A control unit 61 is connected to a circuit unit of the main part of the sensing device 50. The control unit 61 is also connected to a throttle valve disposed in the intake manifold 62 of the internal combustion engine 60.

The main part of the sensing device 50 is disposed near the internal combustion engine 60 in such a manner that the magnetic field sensing plane of the giant magnetoresistance devices of the main part of the sensing device 50 faces the rotary member of magnetic material 52.

As shown in FIG. 20, the main part of the sensing device 50 includes: a housing 53 made up of resin or a non-magnetic material; an attachment part 54; and input/output lead terminals 55 such as a power supply terminal, a ground terminal, and an output terminal, extending from the bottom portion of the housing 53.

As shown in FIG. 21, inside the housing 53 is a substrate 56 on which a circuit such as that described earlier with reference to FIG. 3 is disposed. On the substrate 56, there is also provided giant magnetoresistance devices 57 and a magnet 58 similar to for example the above-described giant magnetoresistance devices 10 and magnet 4, respectively.

The operation will be described below.

When the internal combustion engine 60 is started and the rotary member of magnetic material 52 thus starts to rotate in synchronization with the rotation of the rotating shaft 51, the magnetic field applied to the magnetic field sensing plane of the giant magnetoresistance devices 57 of the main part of the sensing device 50 changes in response to the protruding and recessed portions, and a corresponding change occurs in the resistance of the giant magnetoresistance devices 57. As a result the voltage difference between the mid-point voltages of a Wheatstone bridge circuit including the giant magnetoresistance devices 57 changes correspondingly. The voltage difference is amplified by a differential amplifier, and the output signal of the differential amplifier is supplied to a comparator which in turn compares the output signal of the differential amplifier with a reference voltage and outputs a "0" or "1" signal in response to the comparison result. The output signal of the comparator is then shaped by a waveform shaping circuit. The resultant signal having a "0" or "1" level is supplied to the control unit 61. From this signal, the control unit 61 can acquire the information about the rotation angle and the rotation speed of the crank shaft and the cam shaft in relation to each cylinder of the internal combustion engine 60.

On the basis of the output signal of the sensing device, which has either a "0" or a "1" level, and also on the basis of the information about the opening ratio of the throttle valve 63, the control unit 61 generates control signals by which the ignition timing of ignition plugs (not shown) and the injection timing of the fuel injection valves are controlled.

Figure 22:
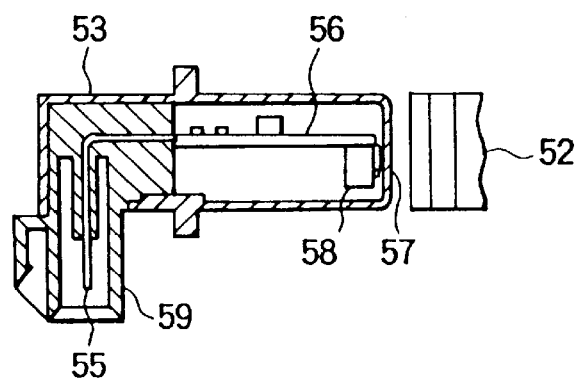
FIG. 22 is a sectional side view illustrating a modified example of the main part of the sensing device based on the seventh embodiment of the invention.

Although, in the specific example described above, the main part of the sensing device 50 has input/output terminals 55 in the form of leads, a connector 59 such as that shown in FIG. 22 which can be attached in a removable fashion to the housing 53 may also be employed.

In this case, the terminals 55 are incorporated in the connector 59 so that when the connector 59 is fitted into the housing 53 the terminals 55 come in contact with the circuit disposed on the substrate 56. This connector 59 makes it easy to handle the sensing device with a simple mechanism, and also makes it easy to mount the sensing device on an internal combustion engine.

As described above, the present embodiment provides a small-sized and high-precision sensing device which can precisely detect the rotation angle (rotation speed) of the crank shaft or the cam shaft of an internal combustion engine. This makes it possible to precisely control the internal combustion engine. Furthermore, the sensing device of the present embodiment can be easily mounted in a highly reliable fashion on an internal combustion engine without requiring a large mounting space.

Furthermore, as soon as the electric power is turned on, the sensing device can start providing a reliable output signal precisely corresponding to the protruding and recessed portions of the rotary member of magnetic material. This makes it possible to detect the crank angle of the internal combustion engine without delay time, and thus makes it also possible to precisely control the ignition timing and the fuel injection timing without delay time. This technique therefore makes it possible to achieve an internal combustion engine which satisfies the requirements prescribed by exhaust gas regulation s.

Still furthermore, by means of utilizing edges corresponding to the protruding and recessed portions of the rotary member of magnetic material, the edges can be made to correspond to top dead center of an internal combustion engine, thus making it possible to improve angle accuracy.

Embodiment 8

Figure 23:
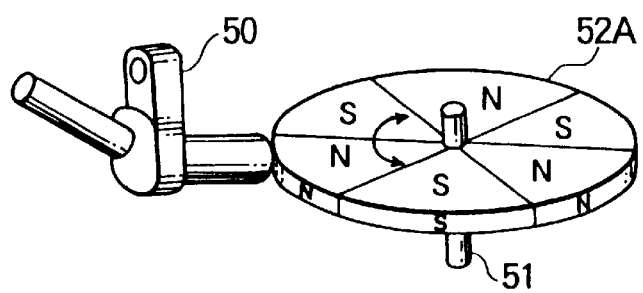
FIG. 23 is a schematic diagram illustrating an eighth embodiment of a sensing device according to the present invention.
Figure 24:
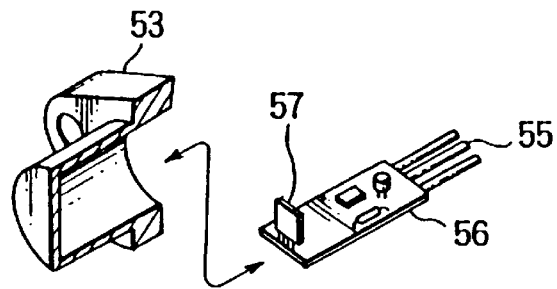
FIG. 24 is an exploded view illustrating the internal structure of the main part of the sensing device of the eighth embodiment according to the present invention.

FIGS. 23 and 24 illustrate an eighth embodiment of the present invention in which the invention is also applied to an internal combustion engine. FIG. 23 is a perspective view illustrating the relative positions of the main part of a sensing device and a rotary member of magnetic material. FIG. 24 illustrates the internal structure of the sensing device.

In FIGS. 23 and 24, elements and parts similar to those in FIGS. 19 or 21 are denoted by similar reference numerals and will not be described here in further detail. The construction of the entire system and the construction of the main part of the sensing device are similar to those shown in FIGS. 18 and 20, respectively.

A rotary member of magnetic material 52A serving as a signal plate is disposed on a crank shaft or a cam shaft of the engine 60 serving as a rotation shaft 51 so that the rotary member of magnetic material 52A can rotate in synchronization with the rotation shaft 51 wherein the rotary member of magnetic material 52A has similar structure to that of the rotary member of magnetic material 52 described above. As in the rotary member of magnetic material 52, the rotary member of magnetic material 52A also consists of magnets which have been produced by means of magnetization so that the rotary member of magnetic material 52A has the desired magnetic poles.

The main part of the sensing device 50 is disposed near the internal combustion engine 60 (refer to FIG.18) in such a manner that the magnetic field sensing plane of the giant magnetoresistance devices of the main part of the sensing device 50 faces the rotary member of magnetic material 52A.

The main part of the sensing device 50 includes: a housing 53 made up of resin or a non-magnetic material; an attachment part 54 (refer to FIG. 20); and input/output lead terminals 55 such as a power supply terminal, a ground terminal, and an output terminal, extending from the bottom portion of the housing 53.

Inside the housing 53 is a substrate 56 on which a circuit such as that described earlier with reference to FIG. 3 is disposed. On the substrate 56, there are also provided giant magnetoresistance devices 57 similar to the above-described giant magnetoresistance devices 10.

The operation will be described below for example.

If the internal combustion engine 60 is started and thus the rotary member of magnetic material 52A starts to rotate in synchronization with the rotation of the rotating shaft 51, the magnetic field applied to the magnetic field sensing plane of the giant magnetoresistance devices 57 of the main part of the sensing device 50 changes in response to the protruding and recessed portions, and a corresponding change occurs in the resistance of the giant magnetoresistance device 57. As a result the voltage difference between the mid-point voltages of a Wheatstone bridge circuit including the giant magnetoresistance devices 57 changes correspondingly. The voltage difference is amplified by a differential amplifier, and the output signal of the differential amplifier is supplied to a comparator which in turn compares the output signal of the differential amplifier with a reference voltage and outputs a "0" or "1" signal in response to the comparison result. The output signal of the comparator is then shaped by a waveform shaping circuit. The resultant signal having a "0" or "1" level is supplied to the control unit 61 (refer to FIG. 18).

From this signal, the control unit 61 can acquire the information about the rotation angle and the rotation speed of the crank shaft and the cam shaft of each cylinder of the internal combustion engine 60.

On the basis of the output signal of the sensing device, which has either a "0" or a "1" level, and also on the basis of the information about the opening ratio of the throttle valve 63, the control unit 61 generates control signals by which the ignition timing of ignition plugs (not shown) and the injection timing of the fuel injection valves are controlled.

Figure 25:
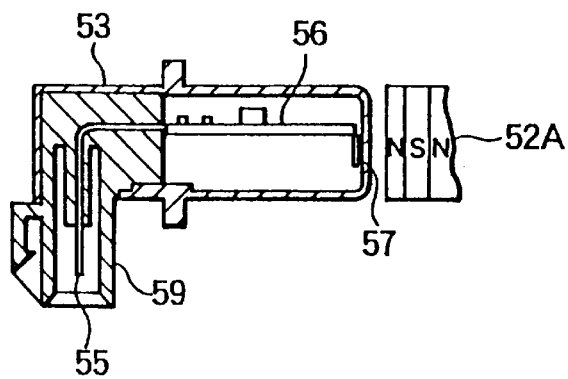
FIG. 25 is a sectional side view illustrating a modified example of the main part of the sensing device based on the eighth embodiment of the invention.

Although, in the specific example described above, the main part of the sensing device 50 has input/output terminals 55 in the form of leads, a connector 59 such as that shown in FIG. 25 which can be attached in a removable fashion to the housing 53 may also be employed. In this case, the terminals 55 are incorporated in the connector 59 so that when the connector 59 is fitted into the housing 53 the terminals 55 come in contact with the circuit disposed on the substrate 56. This connector 59 makes it easy to handle the sensing device with a simple mechanism, and also makes it easy to mount the sensing device on an internal combustion engine.

As described above, the present embodiment also can provide a small-sized and high-precision sensing device at a low cost, which can precisely detect the rotation angle (rotation speed) of the crank shaft or the cam shaft of an internal combustion engine. This makes it possible to precisely control the internal combustion engine. Furthermore, the sensing device of the present embodiment can be easily mounted in a highly reliable fashion on an internal combustion engine without requiring a large mounting space.

Still furthermore, as soon as the electric power is turned on, the sensing device can start providing a reliable output signal precisely corresponding to the magnetic poles of the magnets of the rotary member of magnetic material. This makes it possible to detect the crank angle of the internal combustion engine without a delay time, and thus makes it possible to precisely control the ignition timing and the fuel injection timing without delay time. This technique therefore makes it possible to achieve an internal combustion engine which satisfies the requirements prescribed by exhaust gas regulation s.

Embodiment 9

Figure 26A:
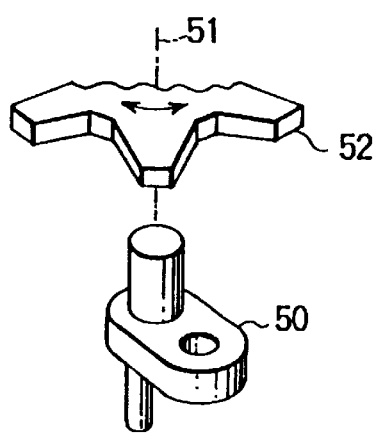
FIGS. 26(a) and 26(b) are schematic diagrams illustrating a ninth embodiment of a sensing device according to the present invention.
Figure 26B:
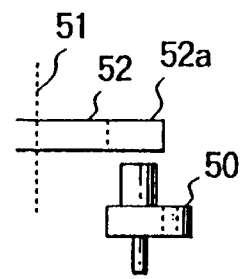

FIGS. 26(a) and 26(b) illustrate a ninth embodiment of the present invention, wherein FIG. 26(a) is a perspective view illustrating the relative positions of the main part of a sensing device and a rotary member of magnetic material, and FIG. 26(b) is a side view thereof. In FIGS. 26(a) and 26(b), similar elements and parts to those in FIG. 19 are denoted by similar reference numerals, and they are not described here in further detail.

In all the previous embodiments, the main part of the sensing device is disposed in a position perpendicular to the rotating axis. In contrast, in this tenth embodiment, the main part of the sensing device is disposed in a position parallel to the rotating axis.

That is, as shown in FIGS. 26(a) and 26(b), the main part of the sensing device 50 is shifted in a direction along the rotating axis 51 so that the magnetic field sensing plane of the giant magnetoresistance device of the main part of the sensing device 50 faces the protruding and recessed portions 52a of the rotary member of magnetic material 52.

The present embodiment provides not only similar effects to those in the seventh embodiment described above, but also an additional advantage that the space near the rotating shaft can be effectively utilized in disposing the main part of the sensing device. In this arrangement, no additional space in a radial direction is required to install the main part of the sensing device, and therefore it is possible to further reduce the size of the sensing device.

Embodiment 10

Figure 27A:
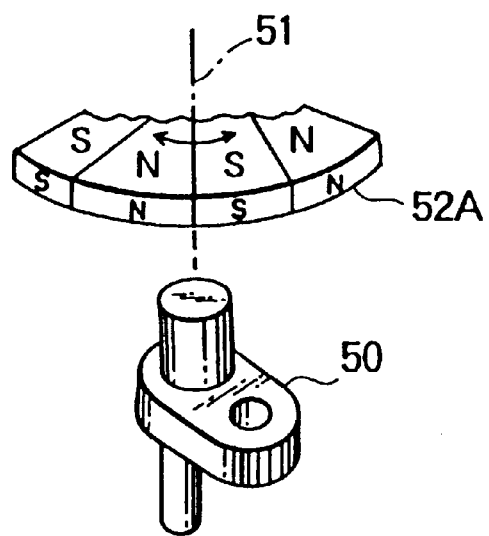
FIGS. 27(a) and 27(b) are schematic diagrams illustrating a tenth embodiment of a sensing device according to the present invention.
Figure 27B:
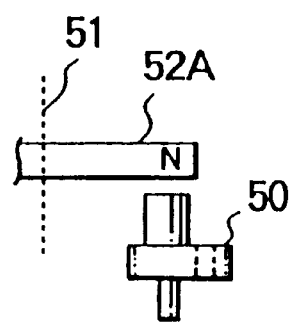

FIGS. 27(a) and 27(b) illustrate a tenth embodiment of the invention. FIG. 27(a) is a perspective view illustrating the relative positions of the main part of a sensing device and a rotary member of magnetic material, and FIG. 27(b) is a side view thereof. In FIG. 27(a) and 27(b), elements and parts similar to those in FIG. 23 are denoted by similar reference numerals, and they are not described here in further detail.

In this embodiment, as in the ninth embodiment described above, the main part of the sensing device is disposed in a position parallel to the rotating axis.

That is, as shown in FIG. 27(a), the main part of the sensing device 50 is disposed in a position parallel to the rotating axis 51 so that the magnetic field sensing plane of the giant magnetoresistance device of the main part of the sensing device 50 faces the magnetic poles of the rotary member of magnetic material 52A.

The present embodiment not only provides effects similar to those in the eighth embodiment described above, but also provides an additional advantage that the space near the rotating shaft can be effectively utilized in disposing the main part of the sensing device. In this arrangement, thus, no additional space in a radial direction is required to install the main part of the sensing device, and therefore it is possible to further reduce the size of the sensing device.

Embodiment 11

Figure 28:
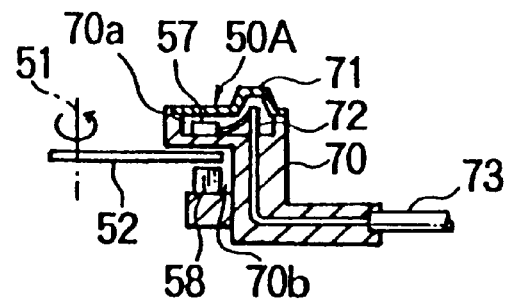
FIG. 28 is a sectional side view illustrating a eleventh embodiment of a sensing device according to the present invention.
Figure 29:
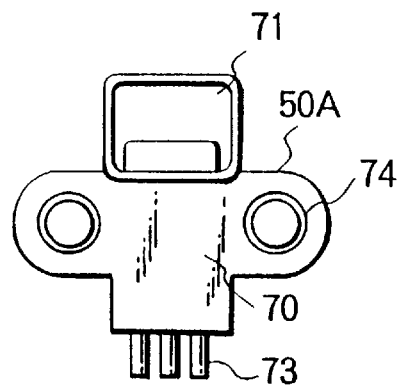
FIG. 29 is a perspective view illustrating the main part of the sensing device of the eleventh embodiment according to the present invention.

FIGS. 28 and 29 illustrate an eleventh embodiment of the invention, wherein FIG. 28 is a schematic diagram illustrating the main part of a sensing device and FIG. 29 is a side view thereof.

In these figures, elements and parts similar to those in FIG. 19 or 21 are denoted by similar reference numerals and will not be described here in further detail.

In all previous embodiments, the giant magnetoresistance of the main part of the sensing device is disposed at a predetermined distance apart from the rotary member of magnetic material. In contrast, in this twelfth embodiment, the rotary member of magnetic material is disposed between a magnet and the giant magnetoresistance device of the main part of the sensing device in such a manner that the rotary member of magnetic material is spaced a predetermined distance apart from the magnet and the giant magnetoresistance device.

The main part of the sensing device 50A includes: a housing 70 made up of for example a resin or a non-magnetic material; a cover 71 for protecting a giant magnetoresistance device 57 similar to the above-described giant magnetoresistance device 10, the giant magnetoresistance device 57 being disposed in a cavity 70a inside the housing 70; and an attachment part 74. In the cavity 70a inside the housing 70, there is provided a substrate (not shown) on which a circuit similar to that described above with reference to FIG. 3 is mounted. The giant magnetoresistance device 57 is mounted on the substrate described above. The giant magnetoresistance device 57 is electrically connected to terminals 72 extending to its bottom portion via the inside of the main part of the sensing device 50A. The other ends of the terminals 72 are connected to input/output lead terminals 73 including a power supply terminal, a ground terminal, and an output terminal, which extend toward the outside for the connection to an external circuit.

A magnet 58 is disposed on the bottom of the space 70b on a side of the housing 70 so that the magnet 58 faces the magnetic field sensing plane of the giant magnetoresistance device 57 disposed in the cavity 70a. The rotary member of magnetic material 52 which is adapted to rotate in synchronization with the rotating shaft 51 is disposed in such a manner that at least its protruding and recessed portions pass through the gap between the giant magnetoresistance device 57 and the magnet 58.

In this arrangement, a magnetic path is formed through the magnet 58, the rotary member of magnetic material 52, and the giant magnetoresistance device 57. When a recessed portion of the rotary member of magnetic material 52 is located between the giant magnetoresistance device 57 and the magnet 58, the magnetic field emerging from the magnet 58 is applied directly to the magnetic field sensing plane of the giant magnetoresistance device 57. On the other hand, when a protruding portion of the rotary member of magnetic material 52 is located between the giant magnetoresistance device 57 and the magnet 58, the magnetic field emerging from the magnet 58 is absorbed into the rotary member of magnetic material 52, and, as a result, substantially no magnetic field is applied to the magnetic field sensing plane of the giant magnetoresistance device 57.

Therefore the above structure has, in effect, the same function as the rotary member of magnetic material 52 at least a part of which is formed with a magnet. As a result, it is also possible in this structure to start a detecting operation as soon as the electric power is turned on.

Figure 30:
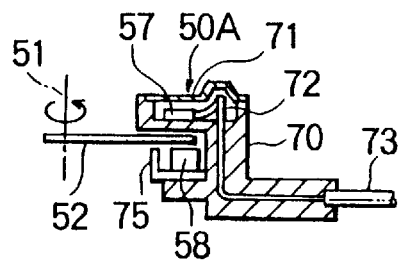
FIG. 30 is a sectional side view illustrating a modified example of the main part of the sensing device based on the eleventh embodiment of the invention.

In the specific example described above, the magnet 58 is disposed on the bottom of the space 70b on the side of the housing 70 so that the magnet 58 faces the magnetic field sensing plane of the giant magnetoresistance device 57 disposed in the cavity 70a. However, a core 75 may be further provided between the bottom of the space 70b and the magnet 58 as shown in FIG. 30 thereby forming a magnetic circuit. In this case, a closed magnetic path starting from the magnet 58 and passing through the rotary member of magnetic material 52, the giant magnetoresistance device 57, the rotary member of magnetic material 52, the core 75, and finally ending at the magnet 58 is established. This magnetic circuit leads to an improvement in the reliability of the sensing operation.

Thus, the present embodiment not only provides effects similar to those in the seventh embodiment described above, but also provides an additional advantage that it is possible to start a sensing operation as soon as the electric power is turned on even though the rotary member of magnetic material is properly positioned between the giant magnetoresistance device and the magnet.

Embodiment 12

Figure 31:
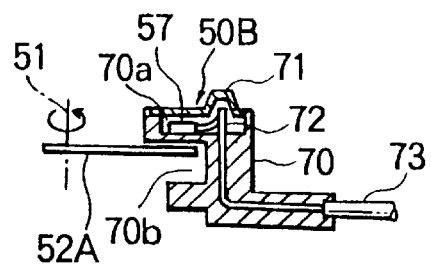
FIG. 31 is a sectional side view illustrating a twelfth embodiment of a sensing device according to the present invention.
Figure 32A:
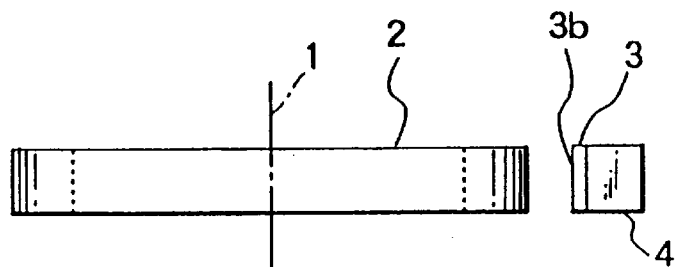
FIGS. 32(a) and 32(b) are schematic diagrams illustrating a conventional sensing device.
Figure 32B:
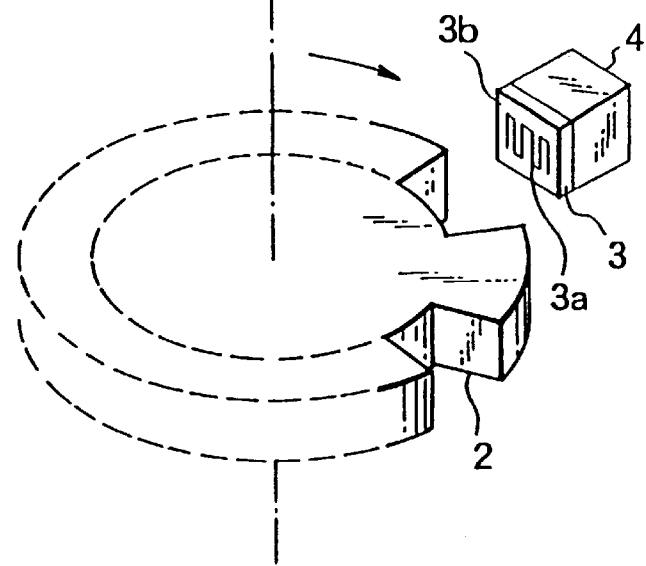
Figure 33:
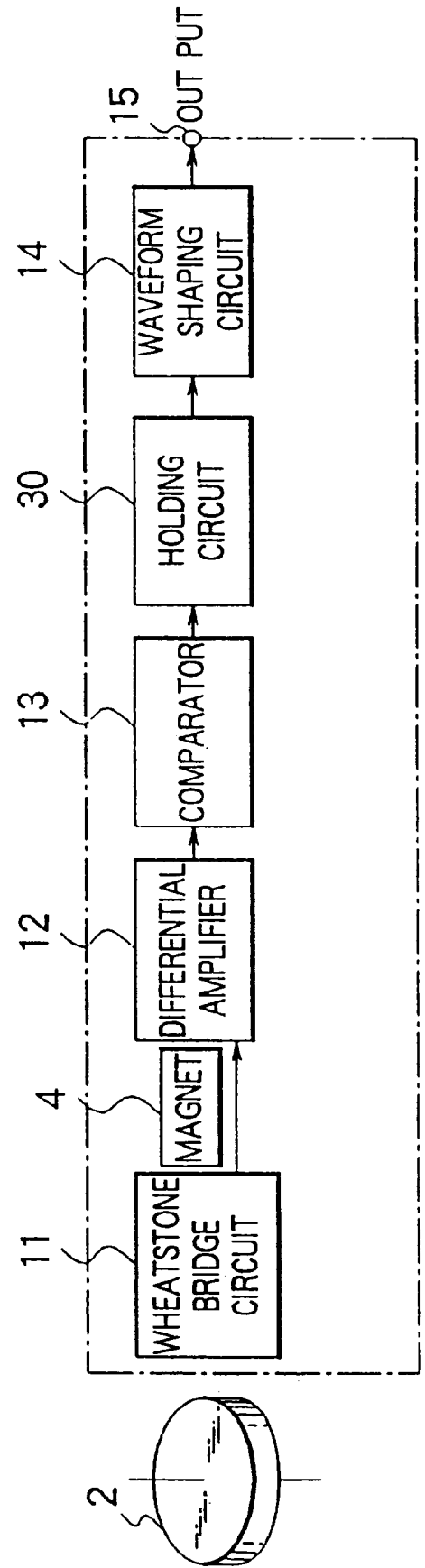
FIG. 33 is a simplified block diagram of the conventional sensing device.
Figure 34:
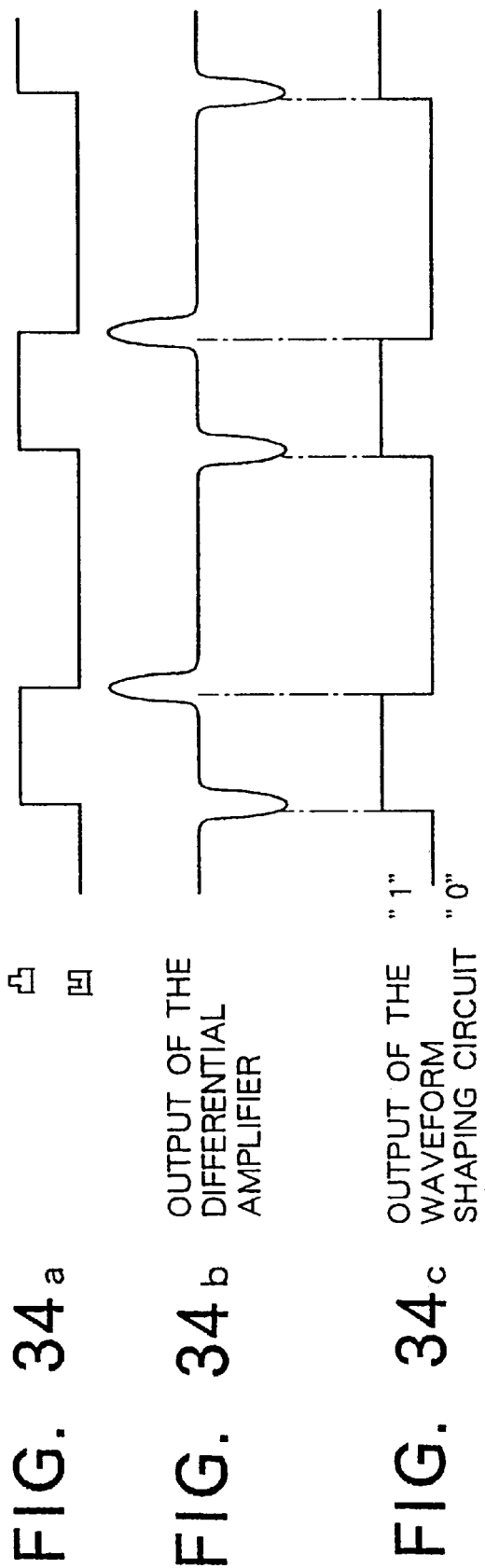
FIGS. 34(a)–34(c) are waveform diagrams illustrating the operation relating to FIG. 33.
Figure 35:
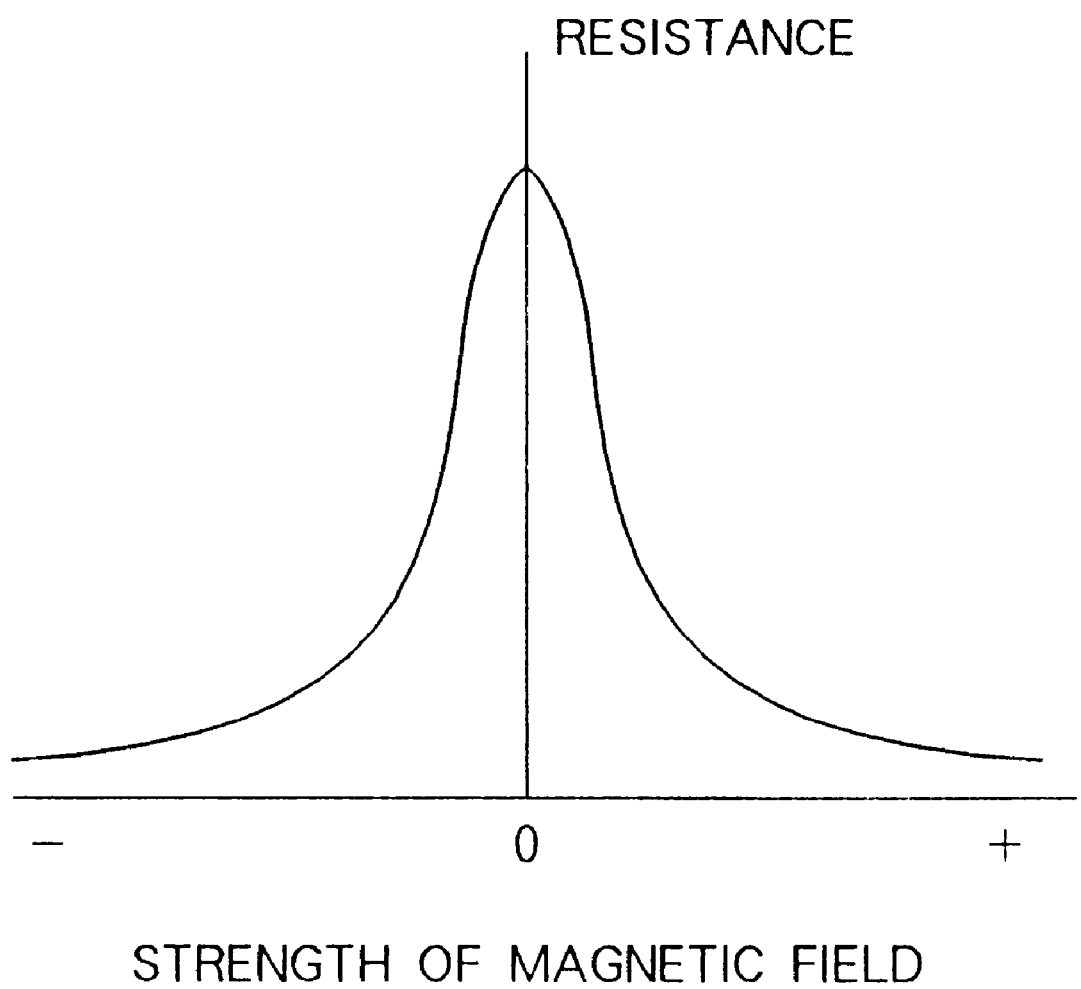
FIG. 35 is a characteristic diagram illustrating the change of resistance of a conventional MR device versus strength of a magnetic field.

FIG. 31 is a sectional side view illustrating a twelfth embodiment of the invention.

In FIG. 31, elements and parts similar to those in FIG. 23 or 28 are denoted by similar reference numerals, and they are not described here in further detail.

In the twelfth embodiment described above, the rotary member of magnetic material is of a common type having protruding and recessed portions such as that shown in FIG. 19. A rotary member composed of magnets (FIG. 23) or a rotary member on which a magnet is mounted (not shown) may also be employed as the rotary member of magnetic material. In this specific embodiment, the rotary member of magnetic material is composed of magnets. In this case, therefore, the magnet 58 employed in the embodiment described above in connection with FIG. 28 is no longer required. The other parts are similar to those of FIG. 28.

In this embodiment, the rotary member of magnetic material 52A is disposed so that at least the peripheral portion of the rotary member of magnetic material 52A passes though the space 70b formed on the side of the housing 70 of the main part of the sensing device 50B and so that the rotary member of magnetic material 52A faces the magnetic field sensing plane of the giant magnetoresistance device 57 disposed in the cavity 70a.

As can be seen from the above description, a magnetic path passing though the rotary member of magnetic material 52A and the giant magnetoresistance device 57 is also established in the present embodiment, which leads to an improvement in sensing performance. As a matter of course, it also becomes possible to start a sensing operation as soon as the electric power is turned on.

Thus, the present embodiment not only provides effects similar to those in the eighth embodiment described above, but also provides an additional advantage that the reliability and the performance of the sensing operation are improved.

Embodiment 13

In all the previous embodiments, the moving member of magnetic material serving as the magnetic field variation inducing means is adapted to rotate in synchronization with the rotating shaft. However, the moving member of magnetic material may also be adapted to move along a straight line. Such a moving member can find application for example in the detection of the degree of opening of an EGR valve in an internal combustion engine.

What is claimed is:

1. A sensing device comprising:

magnetic field generation means for generating a magnetic field;

angularly movable magnetic field variation inducing means for changing the magnetic field generated by said magnetic field generation means as said magnetic field variation inducing means moves, said magnetic field variation inducing means being disposed in a radial direction, a predetermined distance apart from said magnetic field generation means;

a magnetic field sensing element for detecting the magnetic field changed by said magnetic field variation inducing means and for generating an output signal corresponding to the magnetic field, said magnetic field sensing element being disposed on a face of said magnetic generation means so as to be between said magnetic field variation inducing means and said magnetic field generation means along a radial direction; and detection means for detecting the angular displacement of said magnetic field variation inducing means and a relative position of said magnetic field variation inducing means with respect to said magnetic field sensing element when said magnetic field variation inducing means is stationary, on the basis of the output signal of said magnetic field sensing element, wherein a giant magnetoresistance device having a selected hysteresis in resistance versus applied magnetic field characteristic is employed as said magnetic field sensing element.

2. A sensing device comprising:

magnetic field generation means for generating a magnetic field;

angularly movable magnetic field variation inducing means for changing the magnetic field generated by said magnetic field generation means as said magnetic field variation inducing means moves, said magnetic field variation inducing means being disposed in a radial direction, a predetermined distance apart from said magnetic field generation means;

a magnetic field sensing element for detecting the magnetic field changed by said magnetic field variation inducing means and for generating an output signal corresponding to the magnetic field, said magnetic field sensing element being disposed on a face of said magnetic generation means so as to be between said magnetic field variation inducing means and said magnetic field generation means along a radial direction; and detection means for detecting the angular displacement of said magnetic field variation inducing means and a relative position of said magnetic field variation inducing means with respect to said magnetic field sensing element when said magnetic field variation inducing means is stationary, on the basis of the output signal of said magnetic field sensing element, wherein a giant magnetoresistance device is employed as said magnetic field sensing element, and wherein an operating range of said giant magnetoresistance device is set such that the change in resistance of said giant magnetoresistance device is not entirely uniform over the operating range in both directions of change in the magnetic field induced by said magnetic field variation inducing means, so that the resistance of said magnetoresistance device varies in accordance with the magnetic field so as to provide a hysteresis effect.

3. A sensing device comprising:

magnetic field generation means for generating a magnetic field;

magnetic field variation inducing means for changing the magnetic field generated by said magnetic field generation means, said magnetic field variation inducing means being disposed in a radial direction, a predetermined distance apart from said magnetic field generation means;

a magnetic field sensing element for detecting the magnetic field changed by said magnetic field variation inducing means and for generating an output signal corresponding to the magnetic field, said magnetic field sensing element being disposed on a face of said magnetic generation means so as to be between said magnetic field variation inducing means and said magnetic field generation means along a radial direction; and detection means for detecting the angular displacement of said magnetic field variation inducing means and a relative position of said magnetic field variation inducing means with respect to said magnetic field sensing element when said magnetic field variation inducing means is stationary, on the basis of the output signal of said magnetic field sensing element, wherein a giant magnetoresistance device is employed as said magnetic field sensing element, wherein an operating range of said giant magnetoresistance device is set such that the change in resistance of said giant magnetoresistance device is not entirely uniform over the operating range in both directions of change in the magnetic field induced by said magnetic field variation inducing means, so that the resistance of said magnetoresistance device varies in accordance with the magnetic field so as to provide a hysteresis effect, wherein said giant magnetoresistance device is disposed in such a manner that the center of the magnetic field sensing plane of said giant magnetoresistance device deviates from the center of said magnetic field generation means in a direction parallel to a plane containing the displacement direction of said magnetic field variation inducing means by an amount ranging from 0.1 to 10 mm, depending on the size of said giant magnetoresistance device, said giant magnetoresistance device being disposed in such a manner so as to increase a detection accuracy of said giant magnetoresistance device.

4. A sensing device according to claim 1, wherein said magnetic field variation inducing means is composed of a moving member of magnetic material provided with at least one protruding or recessed portion.

5. A sensing device according to claim 2, wherein said magnetic field variation inducing means is composed of a moving member of magnetic material provided with at least one protruding or recessed portion.

6. A sensing device according to claim 1, wherein said magnetic field generation means and said magnetic field variation inducing means are formed into a moving member of magnetic material provided with at least one magnetic pole so that said moving member of magnetic material generates a magnetic field and changes said magnetic field.

7. A sensing device according to claim 2, wherein said magnetic field generation means and said magnetic field variation inducing means are formed into a moving member of magnetic material provided with at least one magnetic pole so that said moving member of magnetic material generates a magnetic field and changes said magnetic field.

8. A sensing device according to claim 4, wherein said moving member of magnetic material is a rotary member which rotates in synchronization with a rotating shaft.

9. A sensing device according to claim 6, wherein said moving member of magnetic material is a rotary member which rotates in synchronization with a rotating shaft.

10. A sensing device according to claim 8, including a main part of the sensing device provided with said giant magnetoresistance device, said rotary member being mounted on a crank shaft or a cam shaft in an internal combustion engine, said main part of the sensing device being disposed adjacent to said internal combustion engine so that said rotary member faces said giant magnetoresistance device.

11. A sensing device according to claim 9, including a main part of the sensing device provided with said giant magnetoresistance device, said rotary member being mounted on a crank shaft or a cam shaft in an internal combustion engine, said main part of the sensing device being disposed adjacent to said internal combustion engine so that said rotary member faces said giant magnetoresistance device.

12. A sensing device according to claim 10, wherein said main part of the sensing device is disposed at a location away from said rotary member in a direction along the rotation axis of the rotating shaft.

13. A sensing device according to claim 11, wherein said main part of the sensing device is disposed at a location away from said rotary member in a direction along the rotation axis of the rotating shaft.

14. A sensing device according claim 12, wherein said main part of the sensing device includes a housing in which said giant magnetoresistance device is disposed, and said rotary member is disposed in a space on a side of said housing in such a manner that at least the periphery of said rotary member faces said giant magnetoresistance device.

15. A sensing device according claim 13, wherein said main part of the sensing device includes a housing in which said giant magnetoresistance device is disposed, and said rotary member is disposed in a space on a side of said housing in such a manner that at least the periphery of said rotary member faces said giant magnetoresistance device.

* * * * *